(12) United States Patent
Li

(10) Patent No.: US 8,810,918 B2
(45) Date of Patent: Aug. 19, 2014

(54) LARGE-APERTURE ZOOM LENS

(75) Inventor: Dayong Li, Saitama (JP)

(73) Assignee: Tamron Co., Ltd., Saitama (JP)

( * ) Notice: Subject to any disclaimer, the term of this patent is extended or adjusted under 35 U.S.C. 154(b) by 65 days.

(21) Appl. No.: 13/589,884

(22) Filed: Aug. 20, 2012

(65) Prior Publication Data

US 2013/0050844 A1 Feb. 28, 2013

(30) Foreign Application Priority Data

Aug. 22, 2011 (JP) ................................. 2011-180672

(51) Int. Cl.
*G02B 15/16* (2006.01)

(52) U.S. Cl.
CPC ...................................... *G02B 15/16* (2013.01)
USPC ......................................................... 359/687

(58) Field of Classification Search
CPC ........ G02B 15/14; G02B 15/15; G02B 15/16; G02B 15/20
USPC .......................................... 359/676, 686, 687
See application file for complete search history.

(56) References Cited

U.S. PATENT DOCUMENTS

| | | | | |
|---|---|---|---|---|
| 5,585,966 | A * | 12/1996 | Suzuki | 359/557 |
| 6,414,800 | B1 * | 7/2002 | Hamano | 359/687 |
| 7,492,524 | B2 * | 2/2009 | Ito | 359/683 |
| 7,889,438 | B2 | 2/2011 | Muramatsu | |
| 7,990,624 | B2 * | 8/2011 | Fujisaki | 359/687 |
| 8,228,617 | B2 | 7/2012 | Fujisaki | |
| 2004/0190157 | A1 * | 9/2004 | Eguchi | 359/689 |
| 2009/0015939 | A1 | 1/2009 | Muramatsu | |
| 2009/0290216 | A1 | 11/2009 | Fujisaki | |
| 2010/0290131 | A1 | 11/2010 | Muramatsu | |
| 2011/0134541 | A1 | 6/2011 | Fujisaki | |

FOREIGN PATENT DOCUMENTS

| | | |
|---|---|---|
| CN | 101109843 A | 1/2008 |
| EP | 1 965 239 B1 | 4/2010 |
| JP | 2000-321497 | 11/2000 |
| JP | 2004-101739 | 4/2004 |
| JP | 2010-266534 | 11/2010 |
| JP | 2011-128361 A | 6/2011 |

OTHER PUBLICATIONS

Chinese Office Action dated May 6, 2014, issued in corresponding Chinese Patent Application 201210301638.X (5 pages).

* cited by examiner

*Primary Examiner* — Darryl J Collins
(74) *Attorney, Agent, or Firm* — Westerman, Hattori, Daniels & Adrian, LLP

(57) ABSTRACT

Wide-angle large-aperture zoom lens provides a field angle greater than 75° at the wide-angle end and a variable magnification power of 2.5 or greater, and can downsize a compensation mechanism for image blur due to hand tremors. The zoom lens includes a first lens group LG1 of positive refractive power, a second lens group LG2 of negative refractive power, a third lens group LG3 of positive refractive power, and a fourth lens group LG4 of positive refractive power, all arranged in sequence from the closest to an object to the closest to an imaging plane, and permits magnification power to vary by varying clearances between adjacent ones of the first lens group LG1 to the fourth lens group LG4. Part of the lens pieces in the third lens group is moved orthogonally to the optical axis to compensate for image blur due to hand tremors.

3 Claims, 28 Drawing Sheets

FIG.1
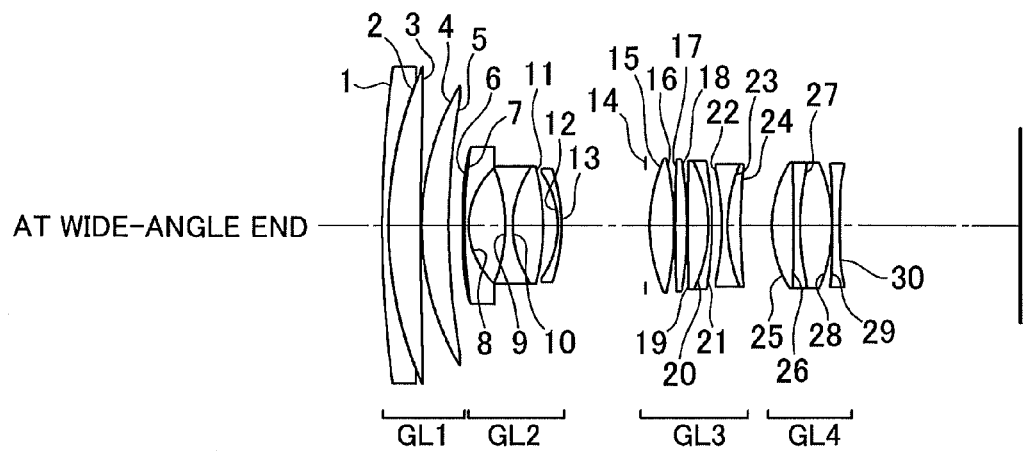
AT WIDE-ANGLE END
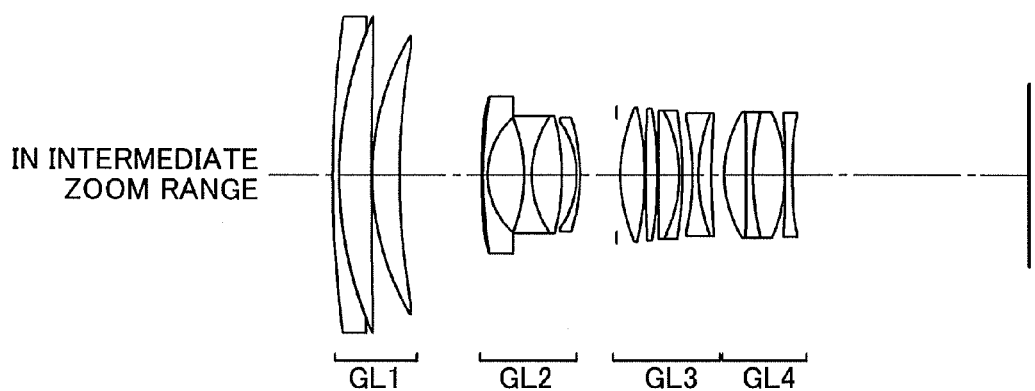
IN INTERMEDIATE ZOOM RANGE
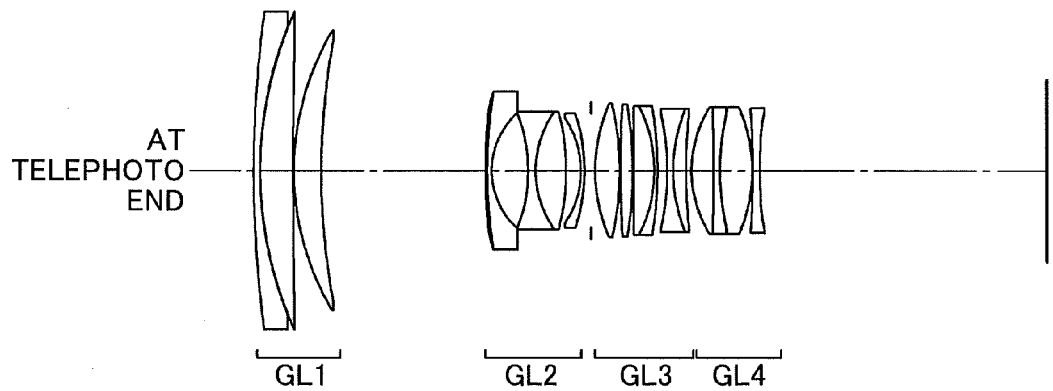
AT TELEPHOTO END (AT WIDE-ANGLE END)

COMATIC ABERRATION (IN INTERMEDIATE ZOOM RANGE)

COMATIC ABERRATION (IN INTERMEDIATE ZOOM RANGE)

(AT TELEPHOTO END)

COMATIC ABERRATION (AT TELEPHOTO END)

(AT WIDE-ANGLE END)

COMATIC ABERRATION

FIG.10 (AT WIDE-ANGLE END)

(IN INTERMEDIATE ZOOM RANGE)

COMATIC ABERRATION (IN INTERMEDIATE ZOOM RANGE)

(AT TELEPHOTO END)

COMATIC ABERRATION (AT WIDE-ANGLE END)

COMATIC ABERRATION

FIG.17 (AT WIDE-ANGLE END)

(IN INTERMEDIATE ZOOM RANGE)

COMATIC ABERRATION (AT TELEPHOTO END)

COMATIC ABERRATION

FIG.21 (AT TELEPHOTO END)

(AT WIDE-ANGLE END)

COMATIC ABERRATION (AT WIDE-ANGLE END)

(IN INTERMEDIATE ZOOM RANGE)

COMATIC ABERRATION (AT TELEPHOTO END)

COMATIC ABERRATION

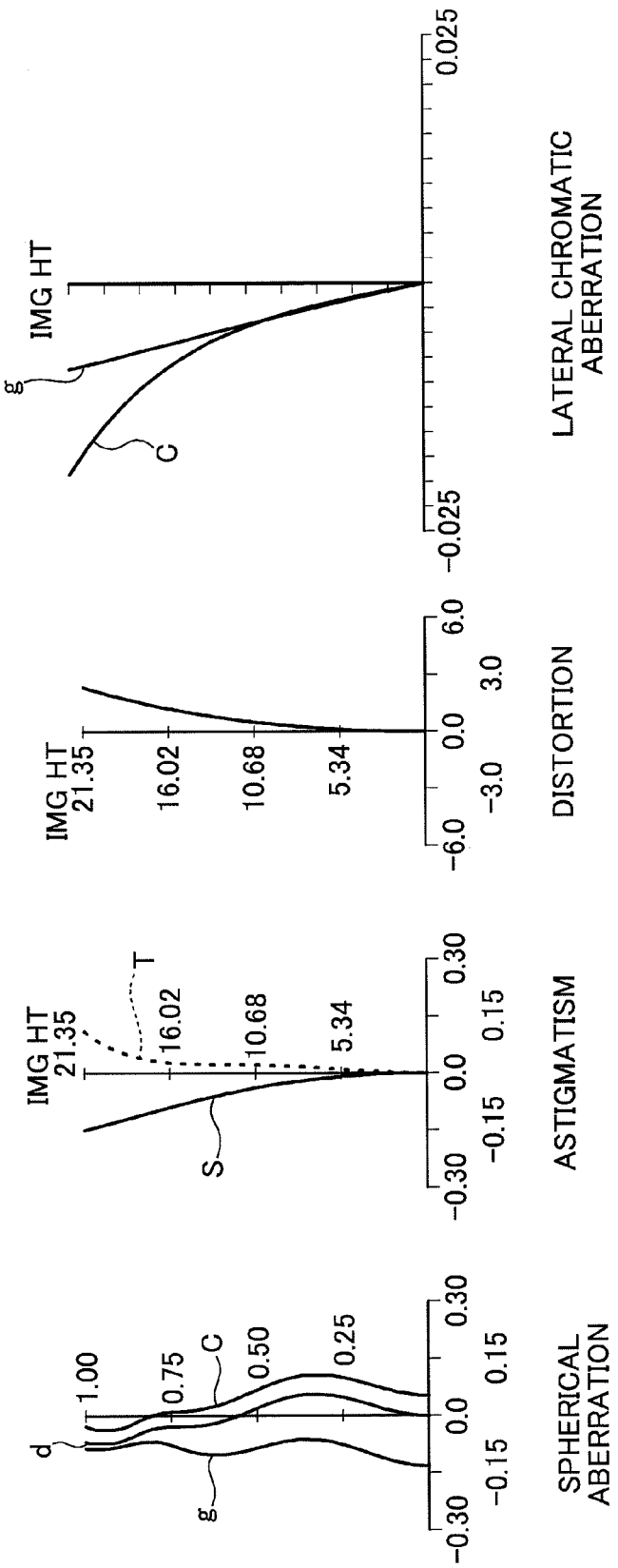

LARGE-APERTURE ZOOM LENS

CROSS-REFERENCE TO RELATED APPLICATIONS

The present patent application claims priority from Japanese Application No. 2011-180672, filed Aug. 22, 2011, which is incorporated herein by reference in its entirety.

FIELD OF THE INVENTION

The present invention relates to a wide-angle large-aperture zoom lens suitable for 35-mm film format single-lens reflex cameras, and more particularly, to such a wide-angle large-aperture zoom lens that provides a field angle greater than 75° at the wide-angle end, a variable magnification power of 2.5 or even greater, and an aperture ratio of approximately 1:2.9 throughout the zoom range.

BACKGROUND OF THE INVENTION

Recent progress in optical designs and optics manufacturing technologies has enabled zoom lenses to be downsized as mentioned below despite their aperture ratios as small as approximately 2.9.

One of such state-of-the-art zoom lenses is that which includes the first or foremost lens group G1 of positive refractive power, the second or second foremost lens group G2 of negative refractive power, the third lens group G3 of positive or negative refractive power, and the fourth or rearmost lens group G4 of positive refractive power, all arranged in this sequence on the closest to an object first basis, and that varies the magnification power by varying clearances between the first lens group G1 and the second lens group G2, the second lens group G2 and the third lens group G3, and the third lens group G3 and the fourth lens group G4. In such a zoom lens, the second lens group G2 includes the first or foremost negative power lens component L21 with its hind surface shaped in concave to enhance negative power, the second or second foremost negative power lens component L22 with its front surface shaped in concave to enhance negative power, the third positive power lens component L23 that is a cemented doublet, with its front surface shaped in convex, comprised of a positive lens member L2$p$ and a negative lens member L2$n$, and the fourth or rearmost negative lens component L24 with its front surface shaped in concave, all arranged in this sequence from the closest to the object to the closest to the imaging field, and the fourth lens group G4 includes a positive power lens component L41 of positive refractive power and a negative power lens component L42 that has a lens member Lasp having at least one surface shaped in asphere where the aspheric surface of the lens member Lasp in the negative power lens component L42 of the fourth lens group G4 can be expressed as in the following formula:

$S(y) = (y2/R)/[1+(1-k \cdot y2/R2)^{1/2}] + C3 \cdot |y|3 + C4 \cdot y4 + C5 \cdot |y|5 + C6 \cdot y6 + C7 \cdot |y|7 + C8 \cdot y8 + C10 \cdot y10 + C12 \cdot y12 + C14 \cdot y14$ where S(y) is a distance along the optical axis from a plane tangential with the vertex of any aspheric surface at height y in vertical directions from the optical axis, R is a paraxial radius of curvature, k is a conic constant, and Cn is an aspheric coefficient of the n-th order aspheric deformation. Now assuming that the aspheric coefficient of the 3rd order aspheric deformation regarding the above-mentioned aspheric surface is C3$b$, the zoom lens meets the requirements as defined by the formulae as follows:

$1 \times 10^{-7} \le |C3b| \le 1 \times 10^{-3}$ (See Patent Document 1 as listed below.)

Another of the prior art zoom lenses is that which includes the foremost or first lens group of positive refractive power, the second or second foremost lens group of negative refractive power, the third lens group of positive refractive power, and the rearmost or fourth lens group of positive refractive power, all arranged in this sequence on the closest to an object first basis and that permits the magnification power to vary from the wide-angle end to the telephoto end by making the first and second lens groups separate farther, the second and third lens groups come closer, and the third and fourth lens groups come closer while all the lens groups shift toward the object, although, for the focusing, the second lens groups alone is moved. Such a zoom lens meets the requirements as in the following formulae (1) to (4):

$0.18 < |f2|/fT < 0.24$     (1)

$1.1 < f1/fT < 1.5$     (2)

$0.6 < f4/fT < 0.9$     (3)

$0.57 < Z2/Z < 0.67$     (4)

where fT is a focal length of the entire optics at the telephoto end, f2 is the focal length of the second lens group, f1 is the focal length of the first lens group, f4 is the focal length of the fourth lens group, Z2 equals to $\beta 2T/\beta 2W$ where $\beta 2W$ is a magnification power of the second lens group at the wide-angle end ($\beta 2W < 0$), and $\beta 2T$ is the magnification power of the second lens group at the telephoto end ($\beta 2T < 0$), and Z equals to fT/fW where fW is a focal length of the entire optics at the wide-angle end (See Patent Document 2 listed below).

Further another of the prior art zoom lenses is that which includes the foremost or first lens group of positive refractive power, the second or second foremost lens group of negative refractive power, the third lens group of positive refractive power, and the rearmost or fourth lens group of positive refractive power, all arranged in this sequence from the closest to an object to the farthest thereto, and that permits the magnification power to vary from the wide-angle end to the telephoto end by making the first and second lens groups separate farther, the second and third lens groups come closer, and the third and fourth lens groups come closer. The third lens group has a leading subgroup of positive refractive power and a trailing subgroup of negative refractive power arranged in this sequence, and the trailing subgroup alone is moved in directions orthogonal to the optical axis to compensate for image blur when a camera/lens is vibrated due to hands' tremor. The fourth lens group has a concave lens piece in a position the closest to the object. (See Patent Document 3 listed below.)

LIST OF THE CITED DOCUMENTS OF THE RELATED ART

[PATENT DOCUMENT 1]
Preliminary Publication of Unexamined Patent Application No. 2000-321497
[PATENT DOCUMENT 2]
Preliminary Publication of Unexamined Patent Application No. 2004-101739
[PATENT DOCUMENT 3]
Preliminary Publication of Unexamined Patent Application No. 2010-266534

The zoom lens disclosed in Patent Document 1 is, although 3 or even higher in variable magnification ratio and 2.9 in aperture ratio, considerably dark as is recognized from the aperture ratio of approximately 4.0 at the telephoto end, and besides, the zoom lens without a compensation feature for image blur due to hands' tremor encounters a considerable disadvantage of poor imaging quality due to hands' tremor. Even if improved to have the aperture ratio of approximately 2.9 at the telephoto end and come to bright, the zoom lens should have its third and fourth lens groups significantly increased in effective aperture, and if designed to have an image blur compensation mechanism, the zoom lens could be overloaded with such a mechanism that is to have an overweight lens piece to move orthogonal to the optical axis for compensating for image blur due to hands' tremor, which necessitates an increased volume of an anti-vibration unit to such an extent that it disables the anti-vibration unit from being incorporated in a lens barrel.

The zoom lens disclosed in Patent Document 2 is 2.5 or even higher in magnification ratio and 2.9 in aperture ratio throughout the zoom range. The zoom lens has its first lens group made compact and light, but seems not to be deliberately designed to incorporate an image blur compensation mechanism since nothing about it is allowed for or suggested in the disclosure. Especially, having its third and fourth lens groups remaining large in diameter, the zoom lens might incorporate a considerably massive image blur compensation mechanism.

The zoom lens disclosed in Patent Document 3 is 2.5 or ever higher in magnification ratio and 2.9 in aperture ratio throughout the zoom range, and such a zoom lens seems promising in incorporating an image blur compensation mechanism therein. However, its imaging field is dimensioned in APS-C, namely, 0.7 times as small as 35-mm film format, and in terms of 35-mm film format, the zoom lens might have the image blur compensation mechanism of extraordinarily greater dimensions, which disagrees to a design trend of downsizing the zoom lens as a whole.

The present invention is made to overcome the aforementioned disadvantages of the prior art zoom lenses, and accordingly, it is an object of the present invention to provide a zoom lens that provides 75° or wider field angle at the wide-angle end and 2.5 or greater magnification ratio and is still adaptable to downsizing a compensation mechanism for image blur due to hands' tremor.

SUMMARY OF THE INVENTION

The present invention is a large-aperture zoom lens that includes the foremost or first lens group LG1 of positive refractive power, the second or second foremost lens group LG2 of negative refractive power, the third lens group LG3 of positive refractive power, and the rearmost or fourth lens group LG4 of positive refractive power, all arranged in this sequence from the closest to an object to the closest to an imaging plane, and that permits the magnification power to vary by varying clearances between adjacent ones of the first lens group LG1 to the fourth lens group LG4. Part of lens pieces in the third lens group LG3 is moved in directions orthogonal to the optical axis to compensate for image blur due to hands' tremor, and the zoom lens meets the requirements as defined in the following formula (5):

$$0.7 < (F12W \times F12T)/(F34W \times F34T) < 1.1 \quad (5)$$

where F12W is a composite focal length of the first and second lens groups at the wide-angle end, F34W is the composite focal length of the third and fourth lens groups at the wide-angle end, F12T is the composite focal length of the first and second lens groups at the telephoto end, and F34T is the composite focal length of the third and fourth lens groups at the telephoto end.

In accordance with the present invention, the large-aperture zoom lens provides a field angle greater than 75° at the wide-angle end and a magnification ratio of 2.5 or even higher, and is still adaptable to downsizing a compensation mechanism for image blur due to hands' tremor.

In one aspect of the present invention, the large-aperture zoom lens meets the requirements regarding its aperture-stop position at the wide-angle end and its focal length Fw at the wide-angle end, as defined in the following formula (6):

$$3.2 < ST\_W/Fw < 4 \quad (6)$$

where ST_W is a distance from the aperture stop to the imaging plane at the wide-angle end, and Fw is a focal length of the entire optics at the wide-angle end.

In another aspect of the present invention, the large-aperture zoom lens meets the requirements regarding focal lengths of the third lens group LG3 and the fourth lens group LG4, as defined in the following formula (7):

$$1.0 < F3/F4 < 1.5 \quad (7)$$

where F3 is the focal length of the third lens group LG3, and F4 is the focal length of the fourth lens group LG4.

When the term $(F12W \times F12T)/(F34W \times F34T)$ exceeds the upper limit defined in the formula (5), the composite focal length of the first and second lens groups is diminished to be advantageously adaptable to downsizing the third and fourth lens groups. However, this brings about an inevitable increase in the effective aperture of the first and second lens groups, which, in turn, leads to difficulty in downsizing a front half of a lens barrel.

When the term is smaller than the lower limit as defined in the formula (5), the effective aperture is reduced in both the first and second lens groups to be adaptable to downsizing the front half of the lens barrel. However, this brings about an inevitable increase in the diameter in the third and fourth lens groups, which, in turn, leads to difficulty in downsizing the image blur compensation mechanism and a focusing motor unit.

When the term ST_W/Fw exceeds the upper limit as defined in the formula (6), the aperture stop and the imaging plane separate farther from each other while the effective diameter is increased in the third and fourth lens groups, which leads to difficulty in downsizing the image blur compensation mechanism and the focusing motor unit.

When the term is lower than the lower limit as defined in the formula (6), the third and fourth lens groups are decreased in radial dimension although the aperture stop and the imaging plane come closer to each other, which results in a sufficient space being unavailable to both the image blur compensation mechanism and the focusing motor unit.

When the term F3/F4 exceeds the upper limit as defined in the formula (7), it is easy to calibrate back focus at the wide-angle end, and instead, an increase in the diameter of the fourth lens group is inevitable.

A design with the term F3/F4 lower than the lower limit as defined in the formula (7) is advantageously adaptable to downsizing the fourth lens group, but brings about an insufficient back focus at the wide-angle end.

BRIEF DESCRIPTION OF THE DRAWINGS

FIG. 1 is a sectional view illustrating a first embodiment of a large-aperture zoom lens according to the present invention, taking a varied zooming posture, at the wide-angle end, in the intermediate zone, and the telephoto end, respectively;

FIG. 28 is graphs illustrating spherical aberration, astigmatism, distortion, and chromatic aberration of magnification in the fourth embodiment of the large-aperture zoom lens, taking the zooming posture at the telephoto end and set at infinity focus.

BEST MODE OF THE INVENTION

Embodiment 1

Figure 2:
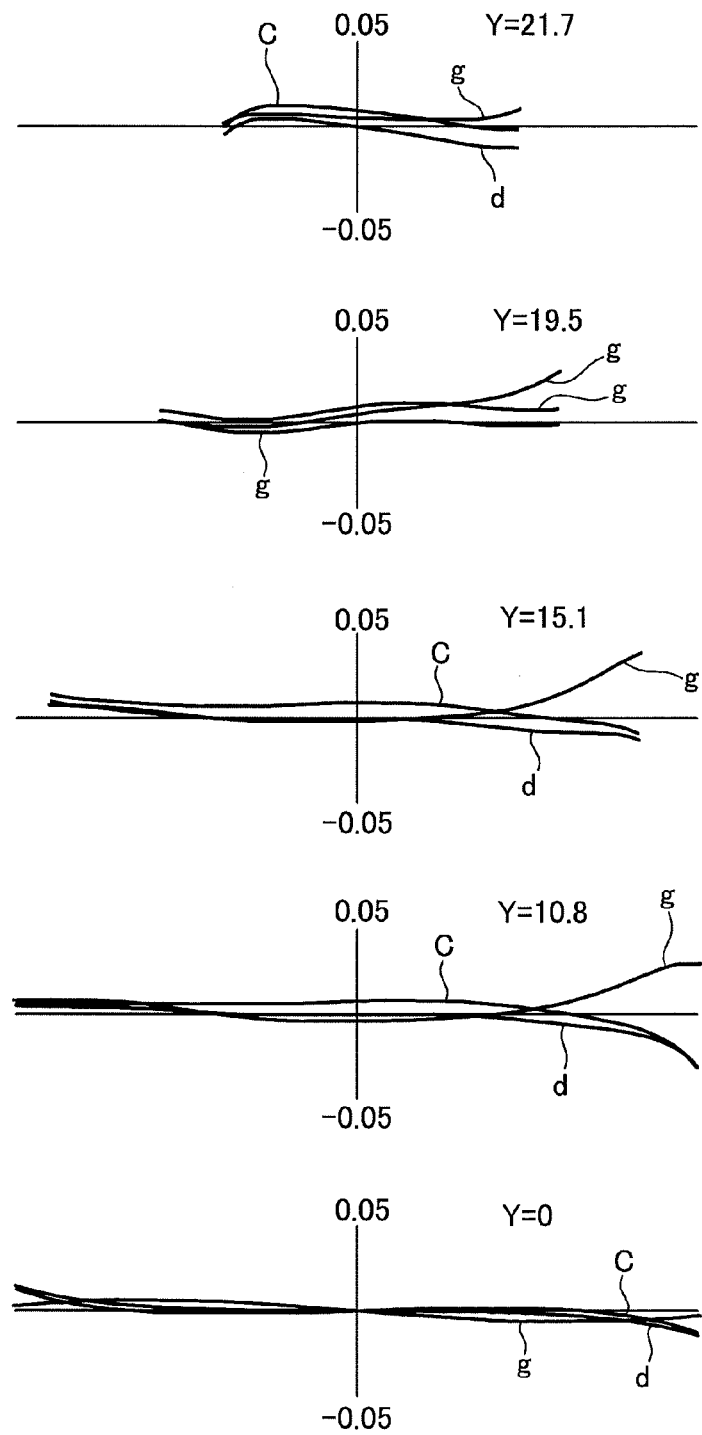
FIG. 2 is graphs illustrating comatic aberration in the first embodiment of the large-aperture zoom lens, taking the zooming posture at the wide-angle end and set at infinity focus.
Figure 3:
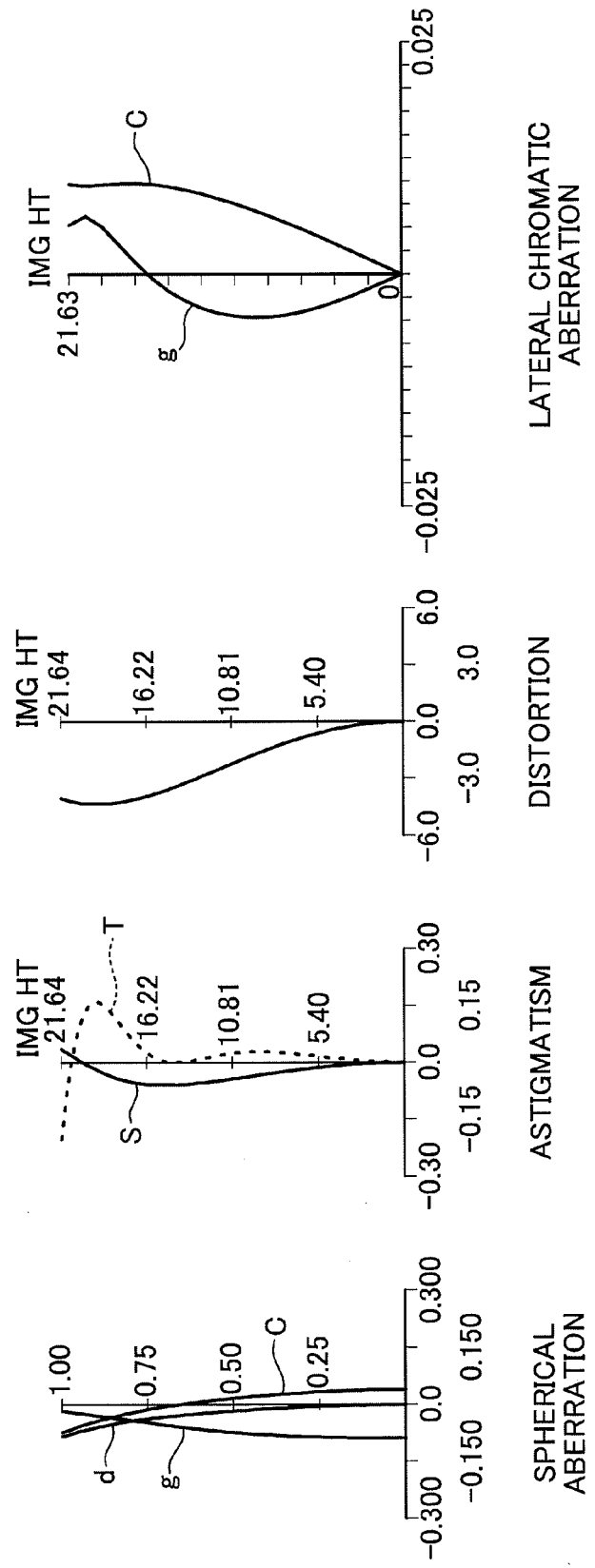
FIG. 3 is graphs illustrating spherical aberration, astigmatism, distortion, and chromatic aberration of magnification in the first embodiment of the large-aperture zoom lens, taking the zooming posture at the wide-angle end and set at infinity focus.
Figure 4:
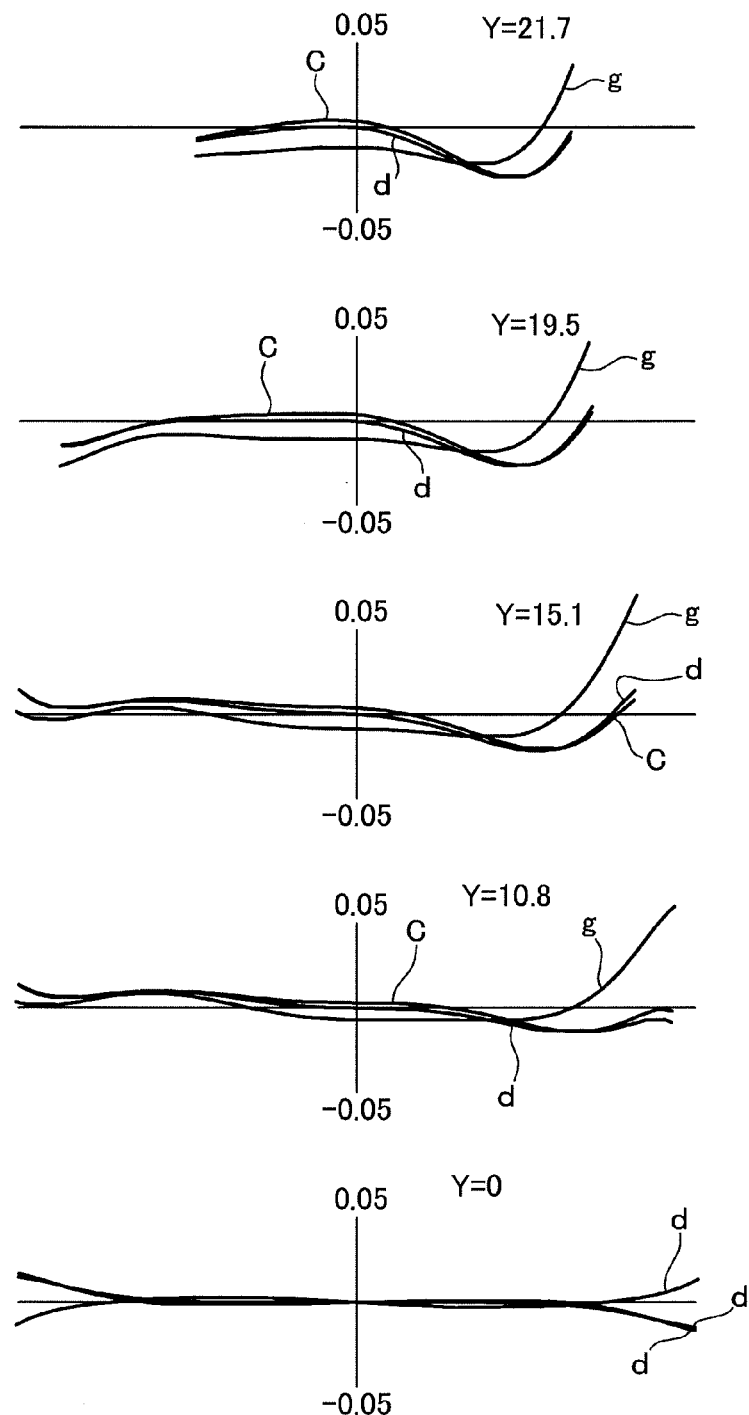
FIG. 4 is graphs illustrating comatic aberration in the first embodiment of the large-aperture zoom lens, taking the zooming posture in the intermediate zoom range and set at infinity focus.
Figure 5:
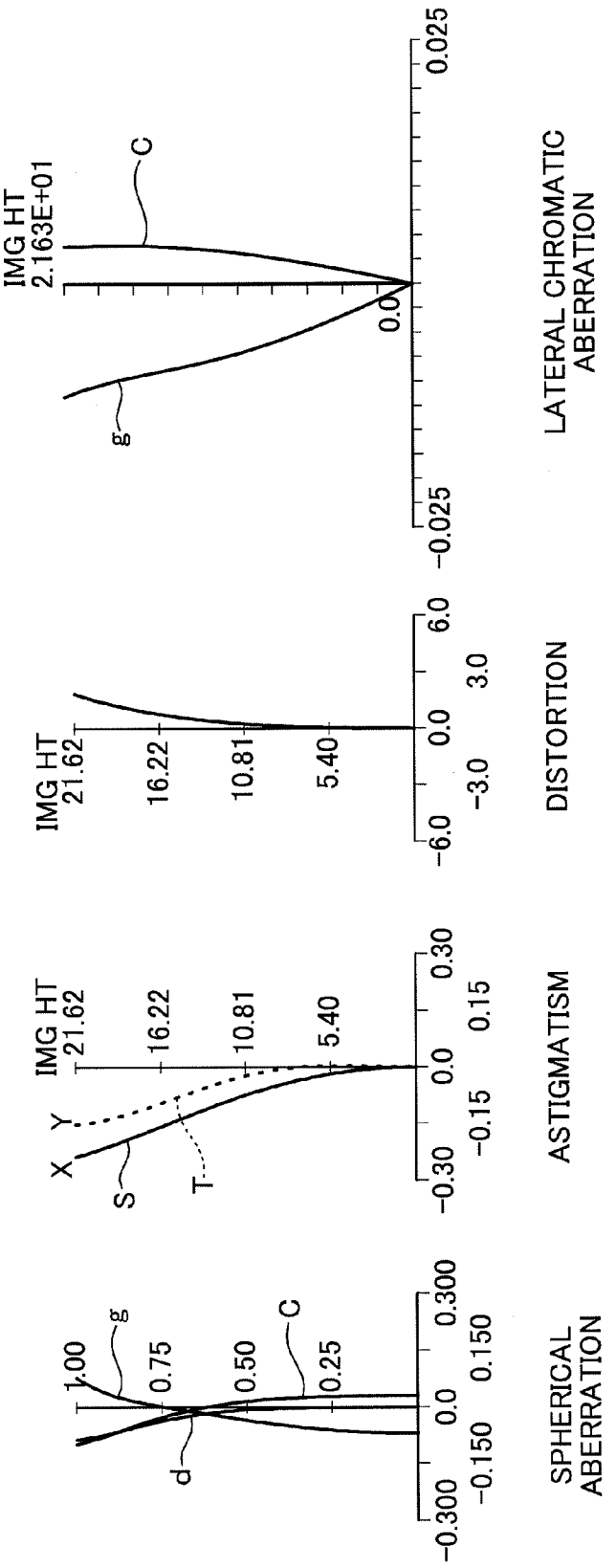
FIG. 5 is graphs illustrating spherical aberration, astigmatism, distortion, and chromatic aberration of magnification in the first embodiment of the large-aperture zoom lens, taking the zooming posture in the intermediate zoom zone and set at infinity focus.
Figure 6:
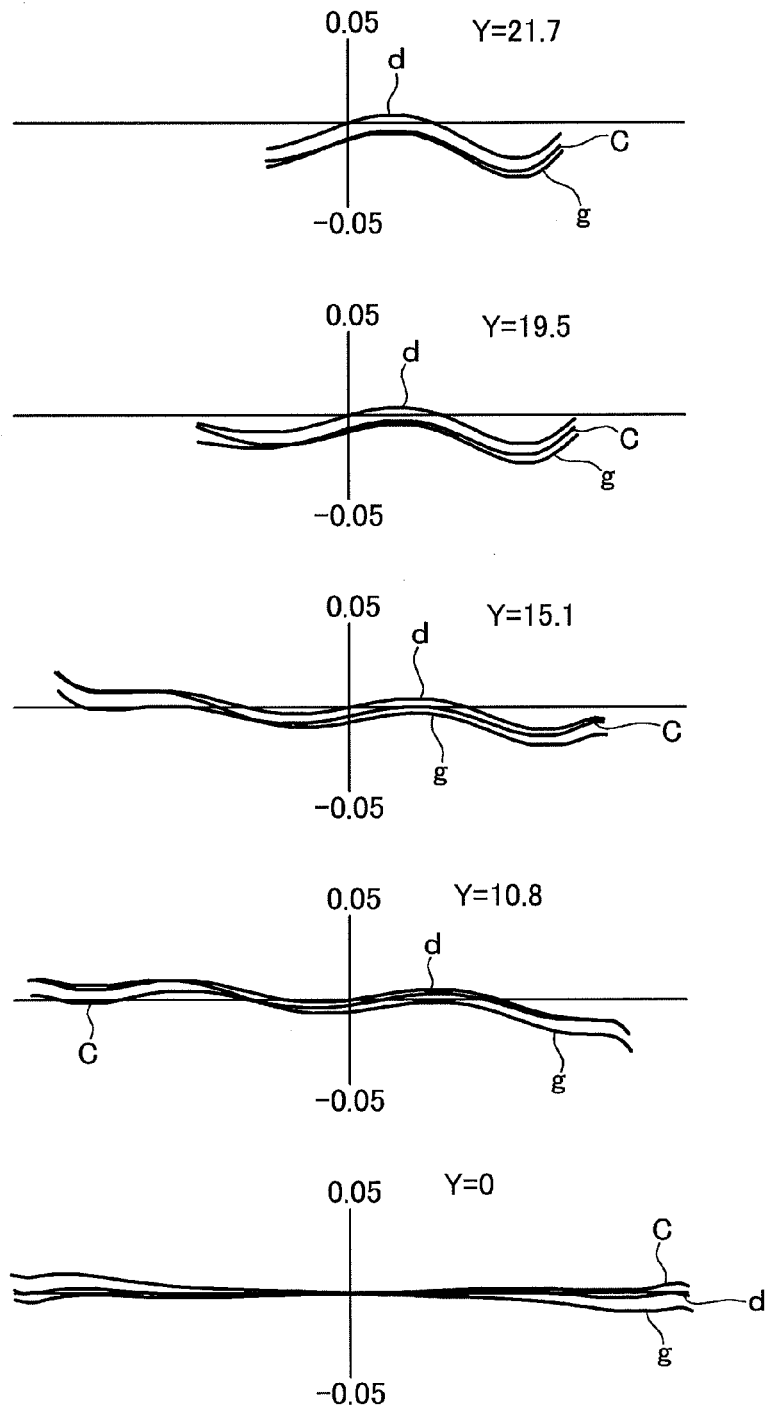
FIG. 6 is graphs illustrating comatic aberration in the first embodiment of the large-aperture zoom lens, taking the zooming posture at the telephoto end and set at infinity focus.
Figure 7:
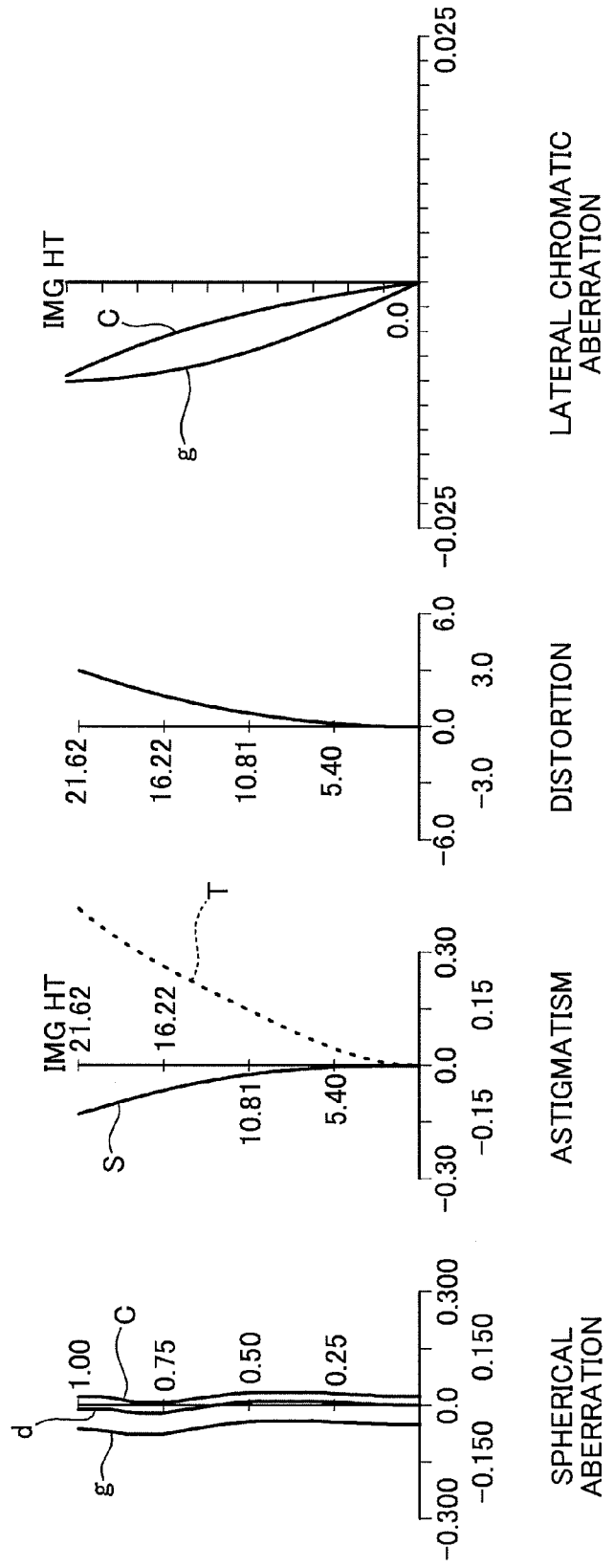
FIG. 7 is graphs illustrating spherical aberration, astigmatism, distortion, and chromatic aberration of magnification in the first embodiment of the large-aperture zoom lens, taking the zooming posture at the telephoto end and set at infinity focus.
Figure 8:
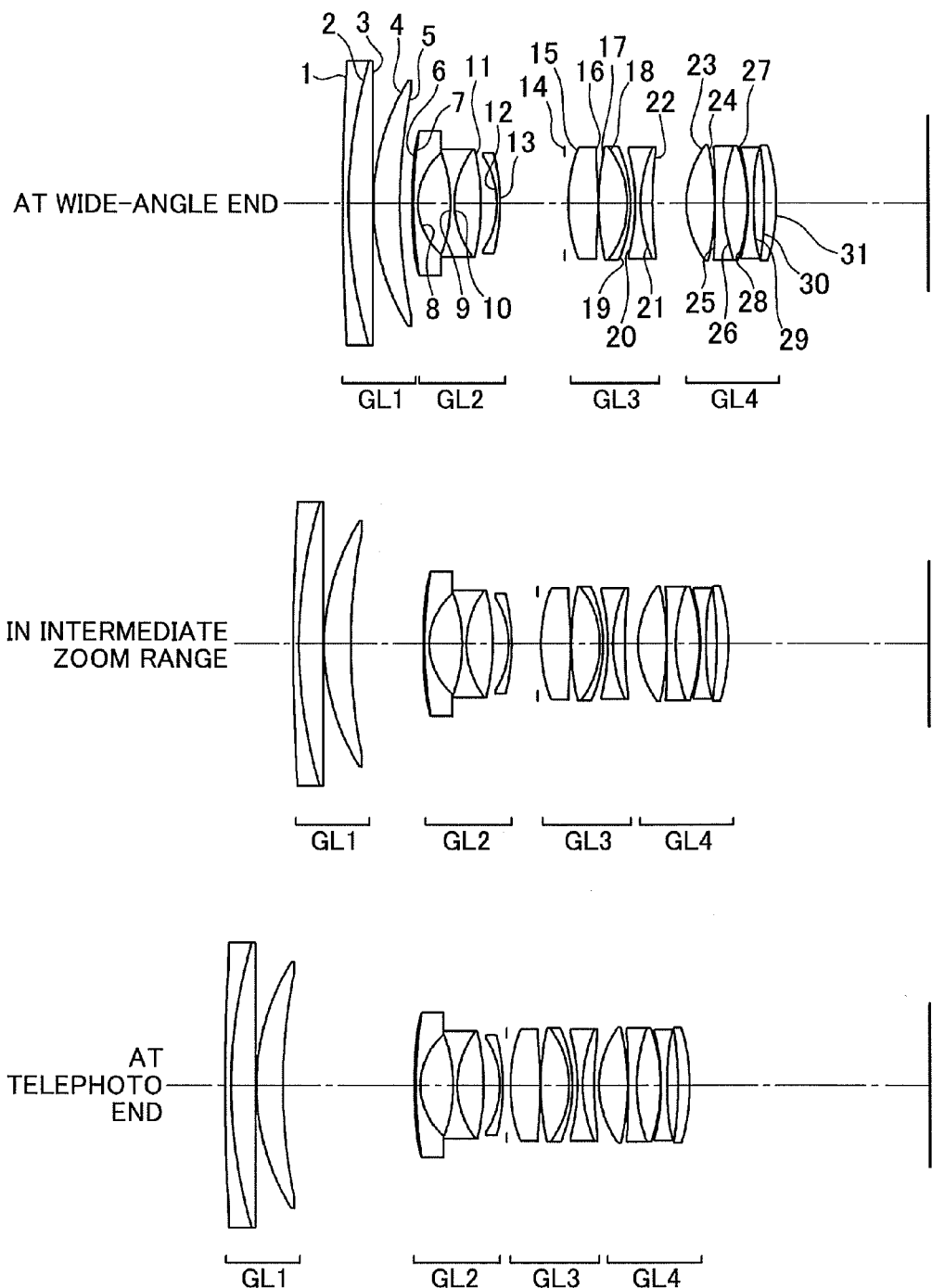
FIG. 8 is a sectional view illustrating a second embodiment of the large-aperture zoom lens according to the present invention, taking a varied zooming posture, at the wide-angle end, in the intermediate zone, and the telephoto end, respectively.
Figure 9:
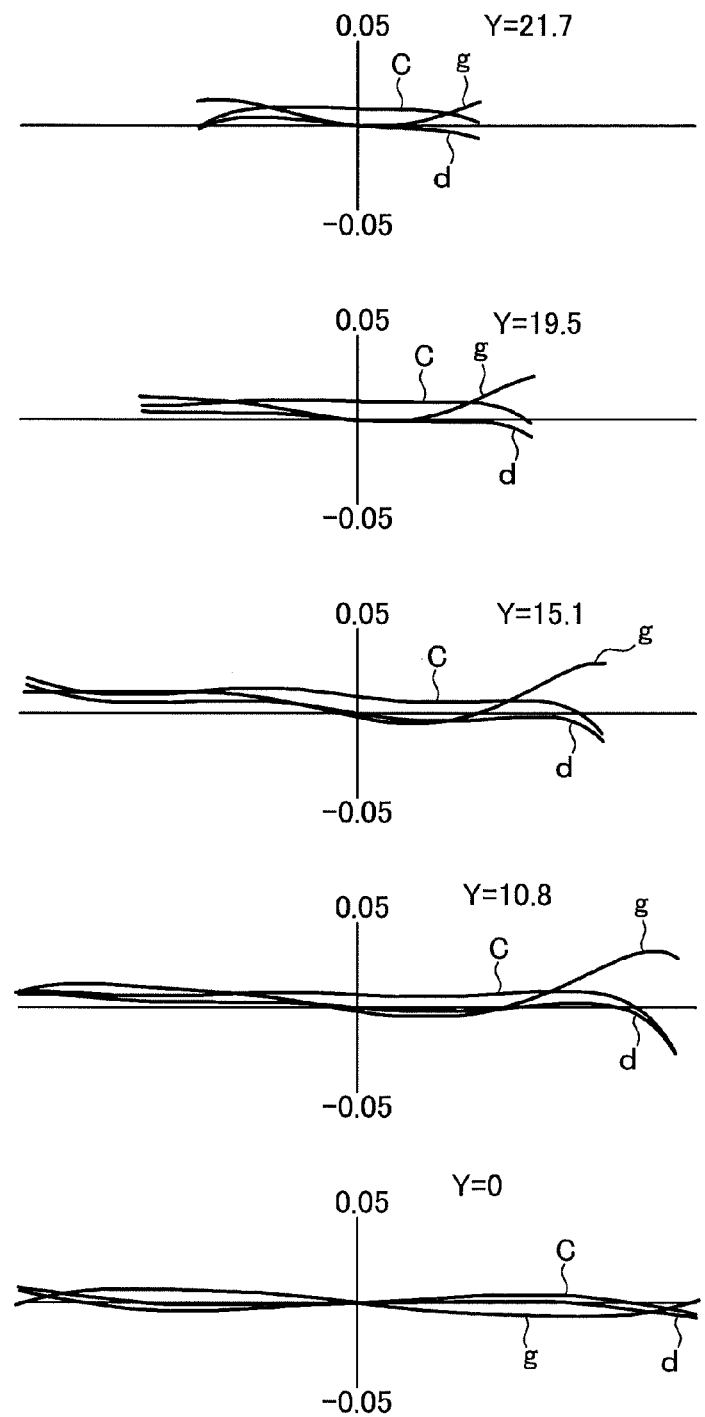
FIG. 9 is graphs illustrating comatic aberration in the second embodiment of the large-aperture zoom lens, taking the zooming posture at the wide-angle end and set at infinity focus.
Figure 10:
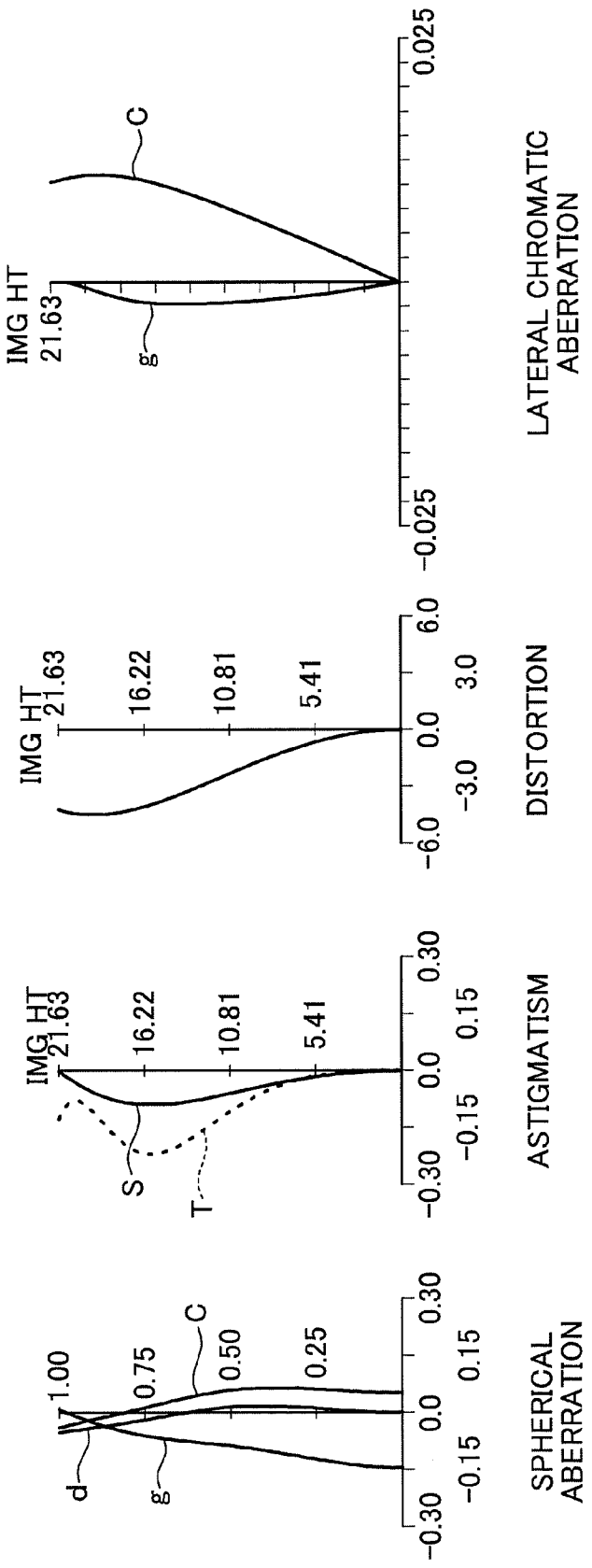
FIG. 10 is graphs illustrating spherical aberration, astigmatism, distortion, and chromatic aberration of magnification in the second embodiment of the large-aperture zoom lens, taking the zooming posture at the wide-angle end and set at infinity focus.
Figure 11:
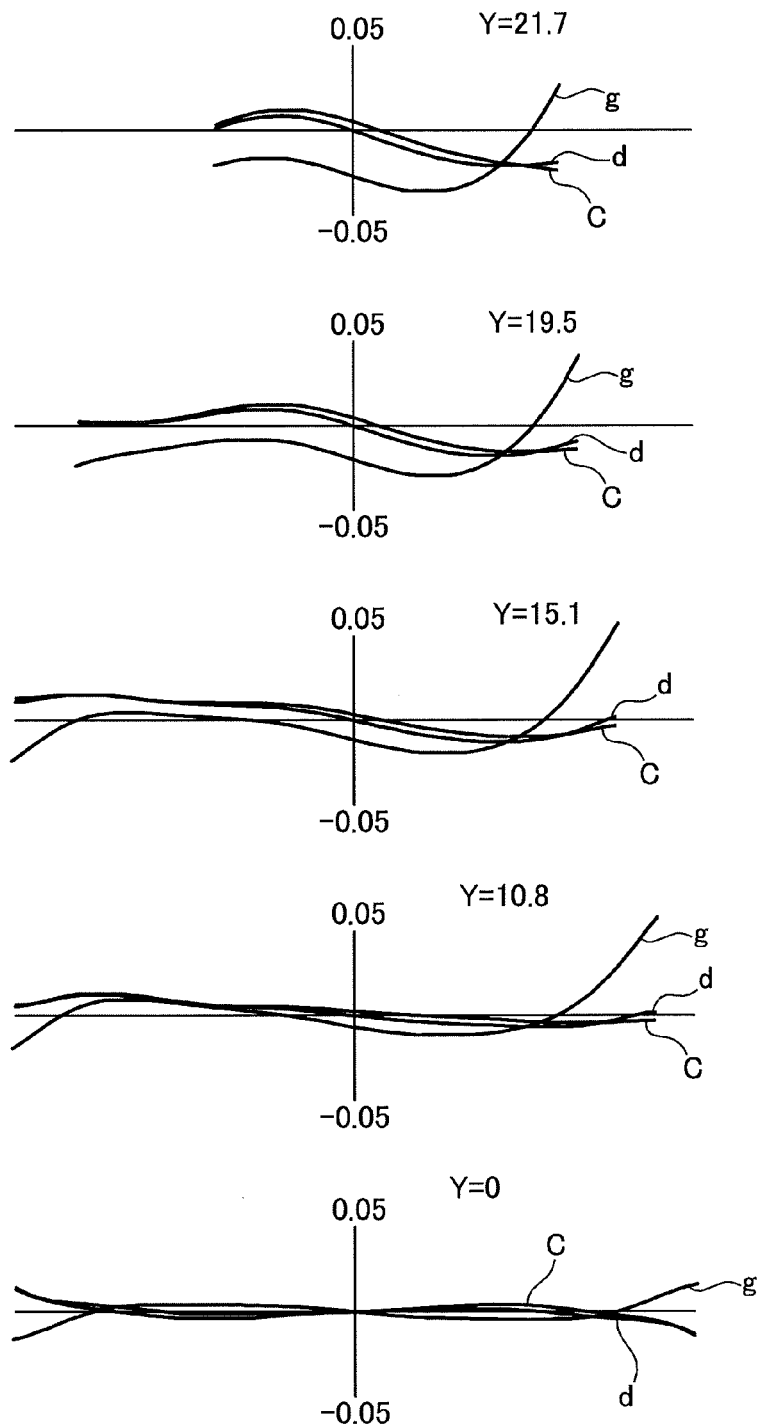
FIG. 11 is graphs illustrating comatic aberration in the second embodiment of the large-aperture zoom lens, taking the zooming posture in the intermediate zoom range and set at infinity focus.
Figure 12:
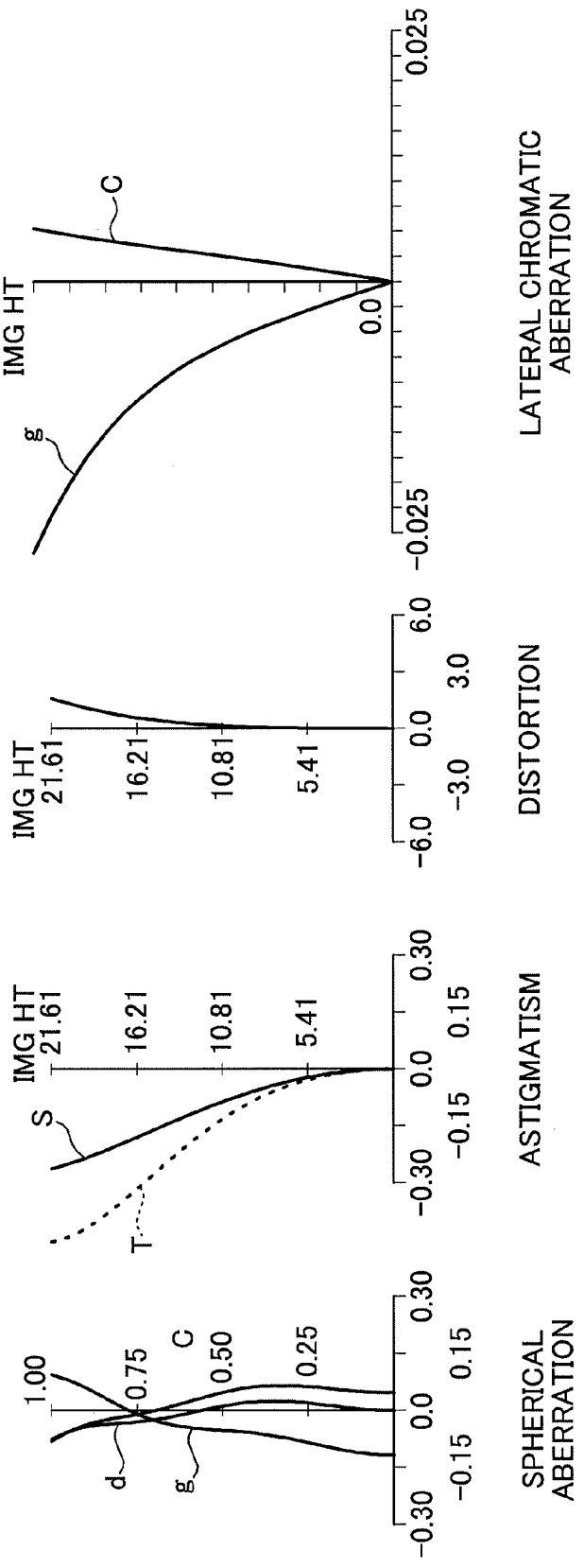
FIG. 12 is graphs illustrating spherical aberration, astigmatism, distortion, and chromatic aberration of magnification in the second embodiment of the large-aperture zoom lens, taking the zooming posture in the intermediate zoom zone and set at infinity focus.
Figure 13:
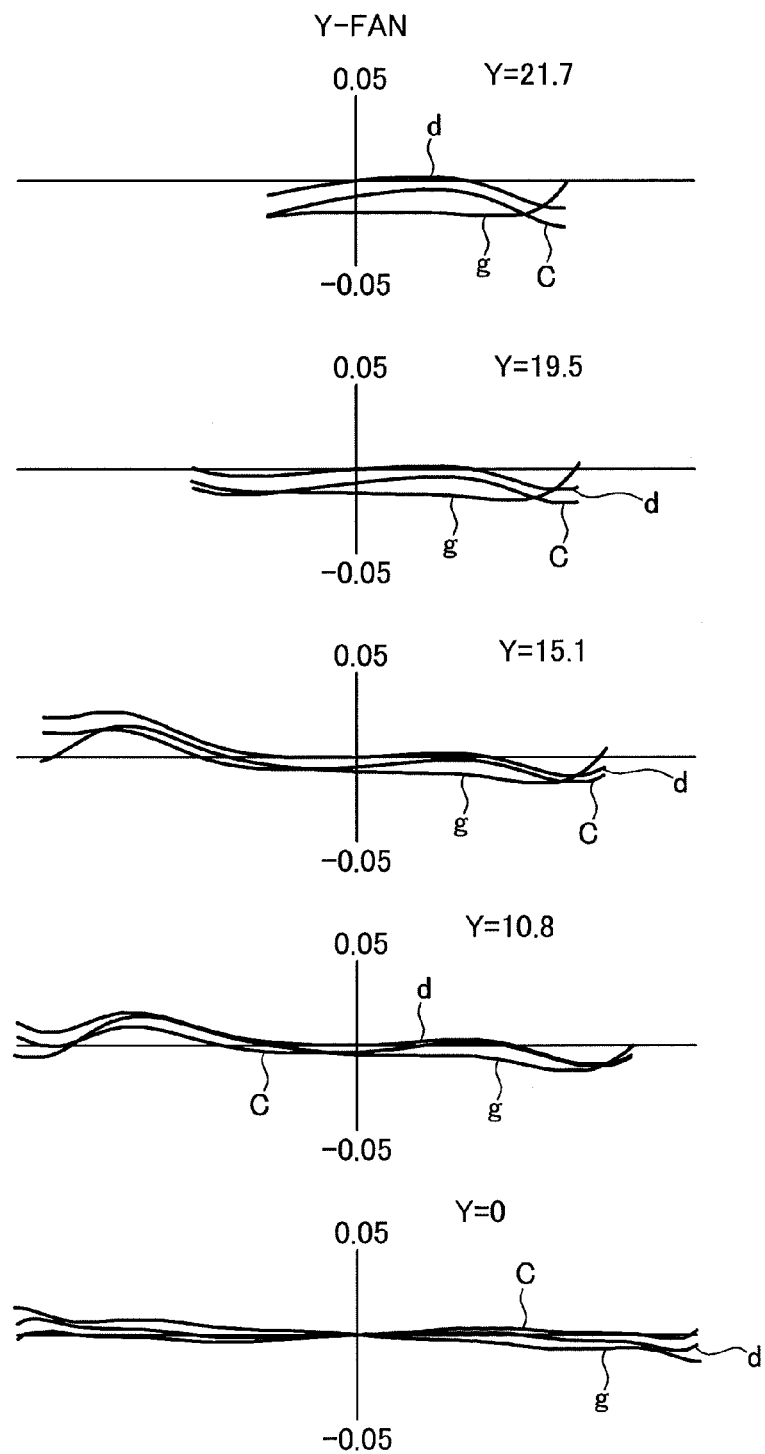
FIG. 13 is graphs illustrating comatic aberration in the second embodiment of the large-aperture zoom lens, taking the zooming posture at the telephoto end and set at infinity focus.
Figure 14:
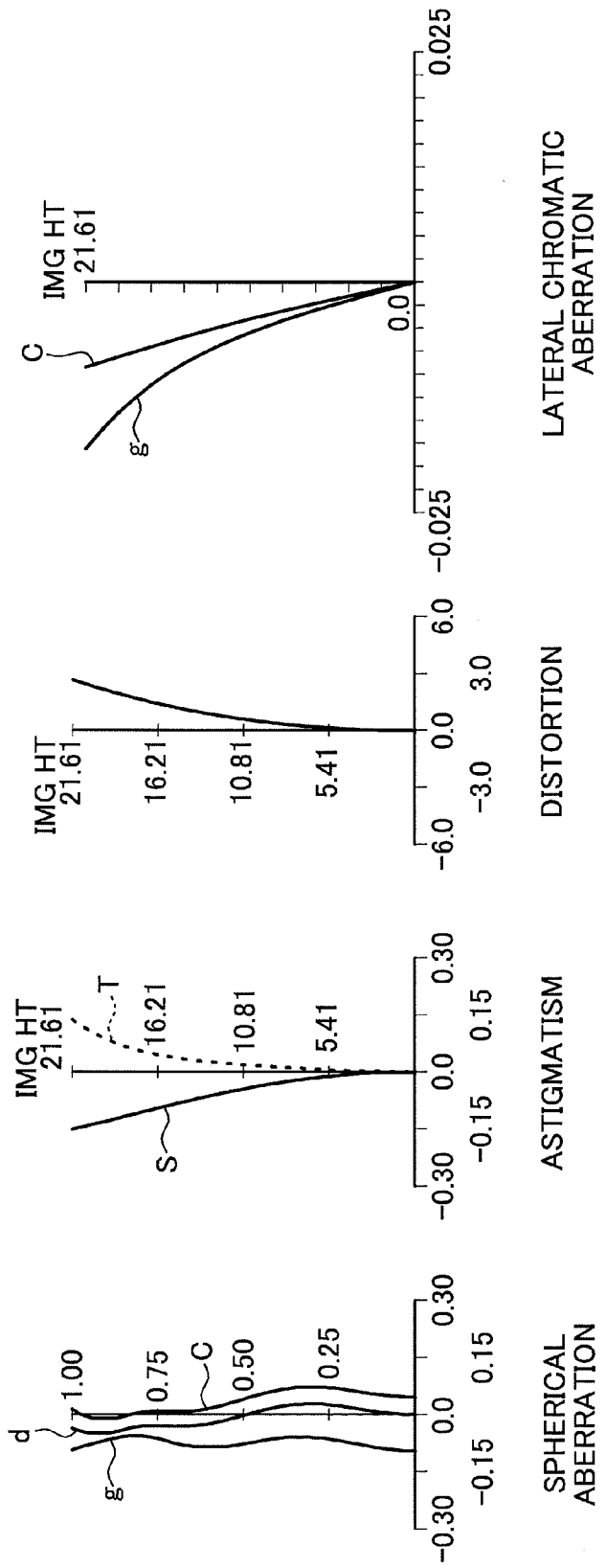
FIG. 14 is graphs illustrating spherical aberration, astigmatism, distortion, and chromatic aberration of magnification in the second embodiment of the large-aperture zoom lens, taking the zooming posture at the telephoto end and set at infinity focus.
Figure 15:
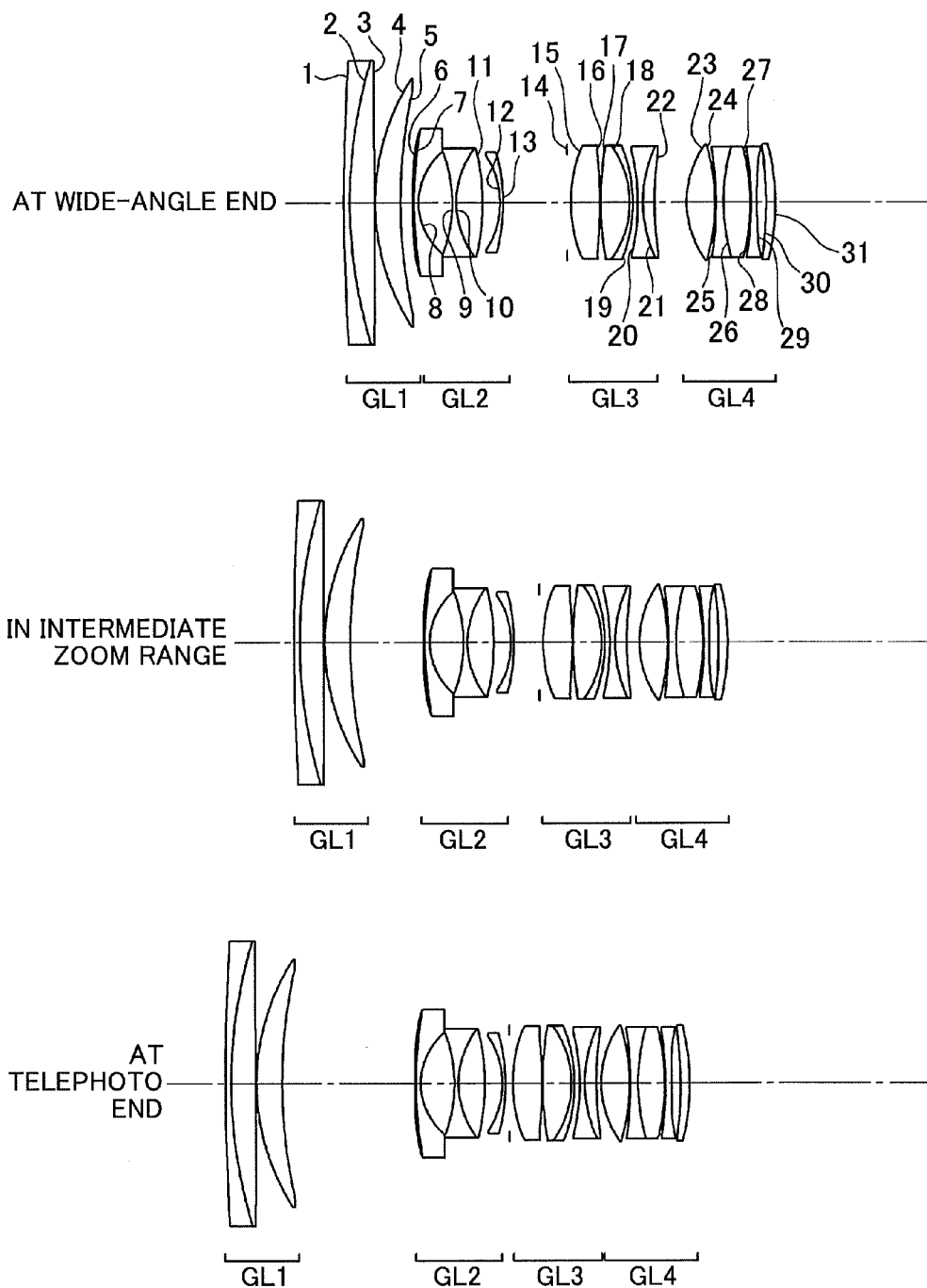
FIG. 15 is a sectional view illustrating a third embodiment of the large-aperture zoom lens according to the present invention, taking a varied zooming posture, at the wide-angle end, in the intermediate zone, and the telephoto end, respectively.
Figure 16:
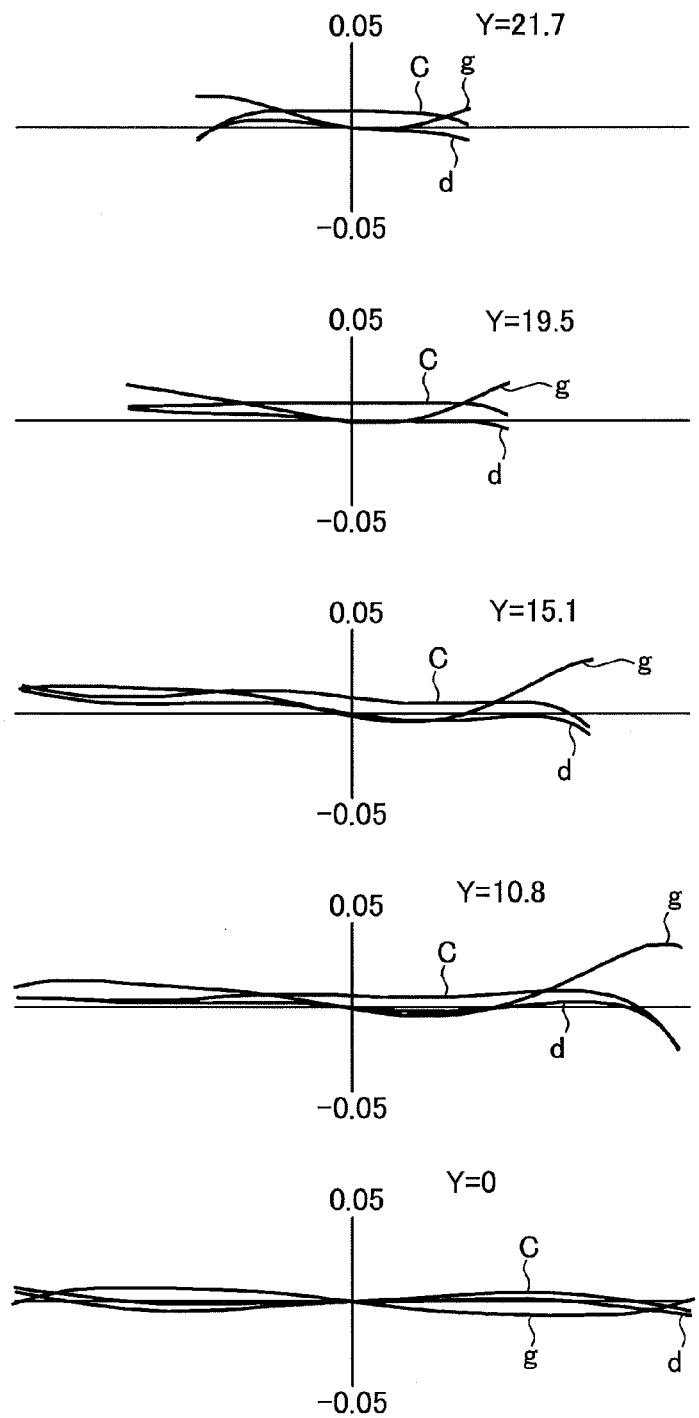
FIG. 16 is graphs illustrating comatic aberration in the third embodiment of the large-aperture zoom lens, taking the zooming posture at the wide-angle end and set at infinity focus.
Figure 17:
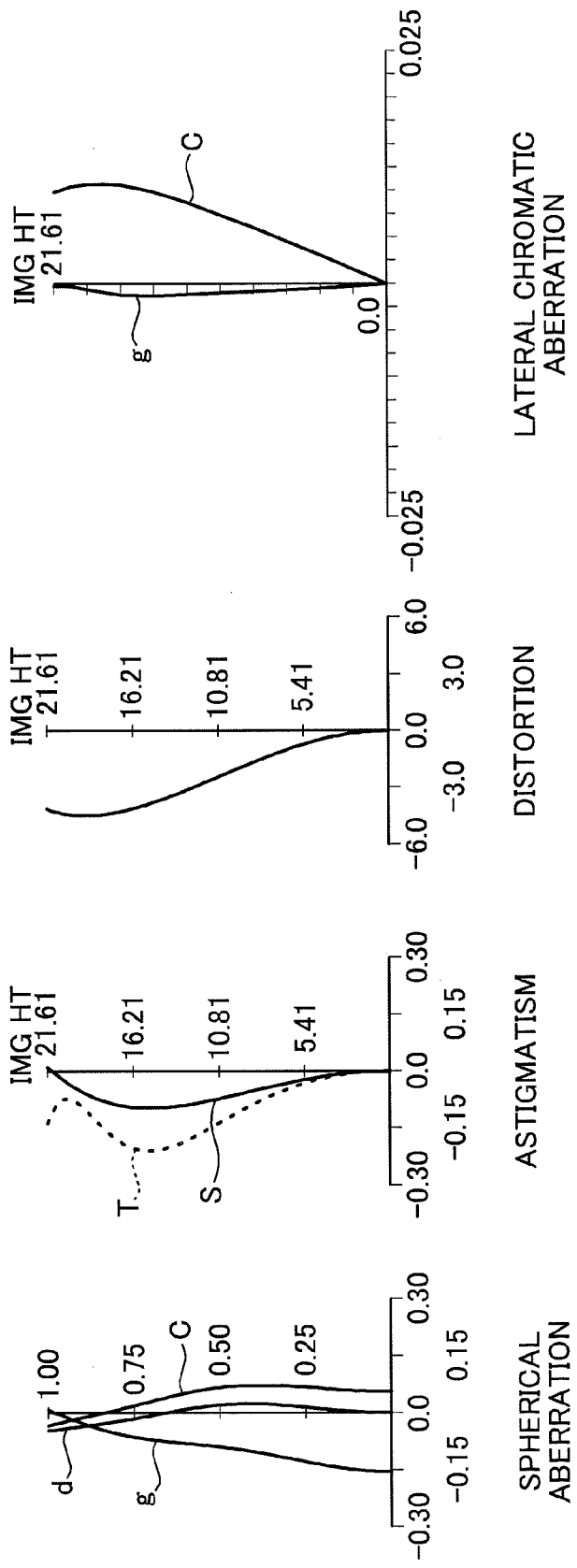
FIG. 17 is graphs illustrating spherical aberration, astigmatism, distortion, and chromatic aberration of magnification in the third embodiment of the large-aperture zoom lens, taking the zooming posture at the wide-angle end and set at infinity focus.
Figure 18:
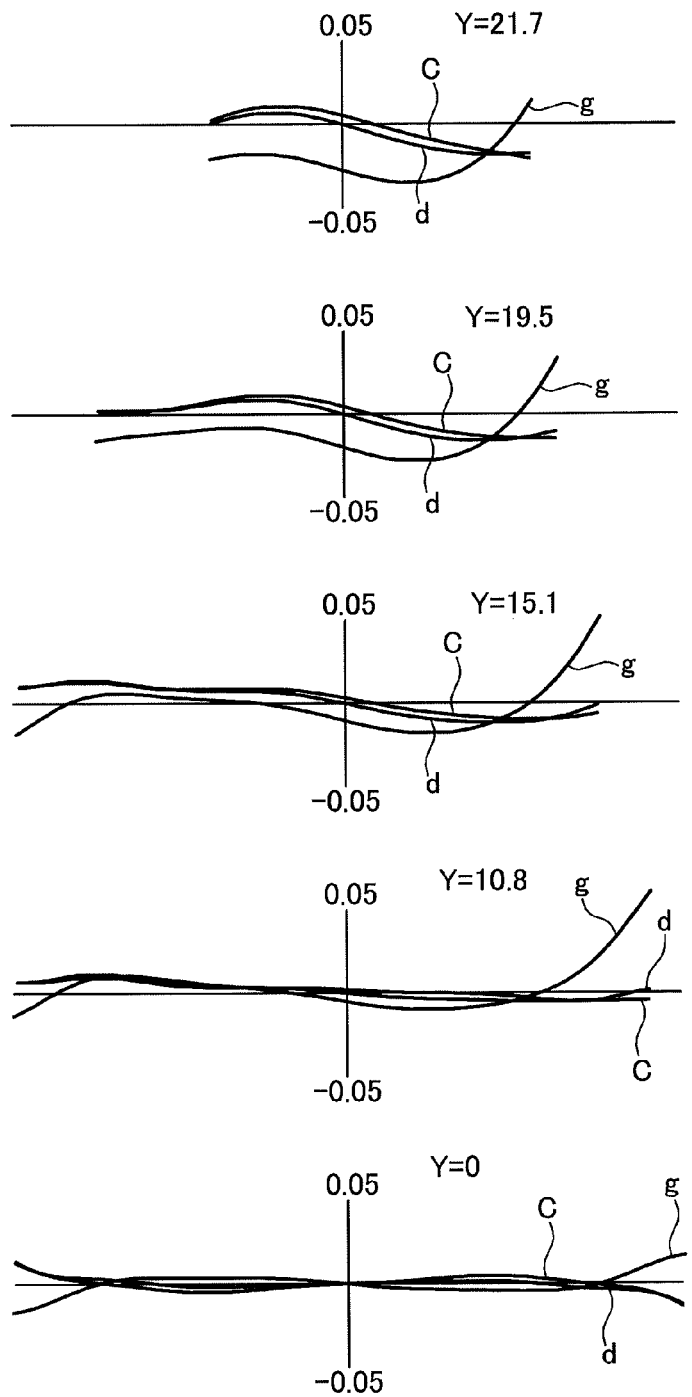
FIG. 18 is graphs illustrating comatic aberration in the third embodiment of the large-aperture zoom lens, taking the zooming posture in the intermediate zoom range and set at infinity focus.
Figure 19:
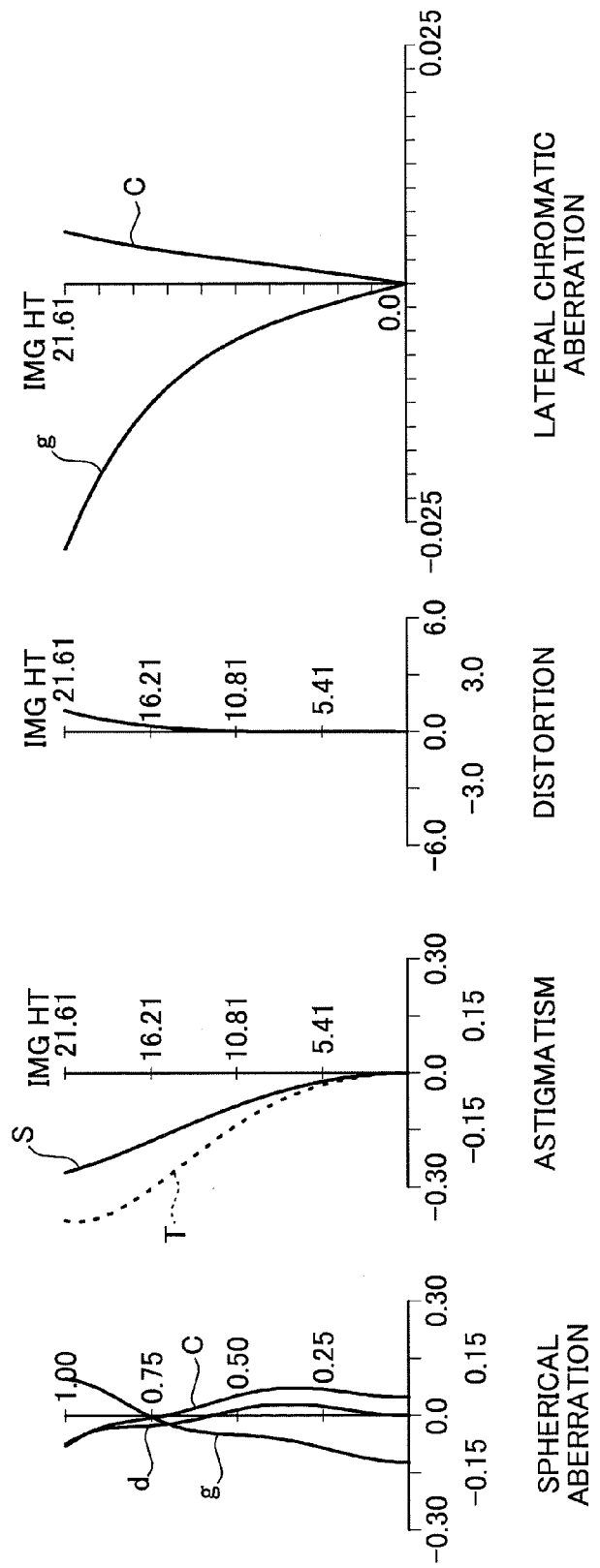
FIG. 19 is graphs illustrating spherical aberration, astigmatism, distortion, and chromatic aberration of magnification in the third embodiment of the large-aperture zoom lens, taking the zooming posture in the intermediate zoom zone and set at infinity focus.
Figure 20:
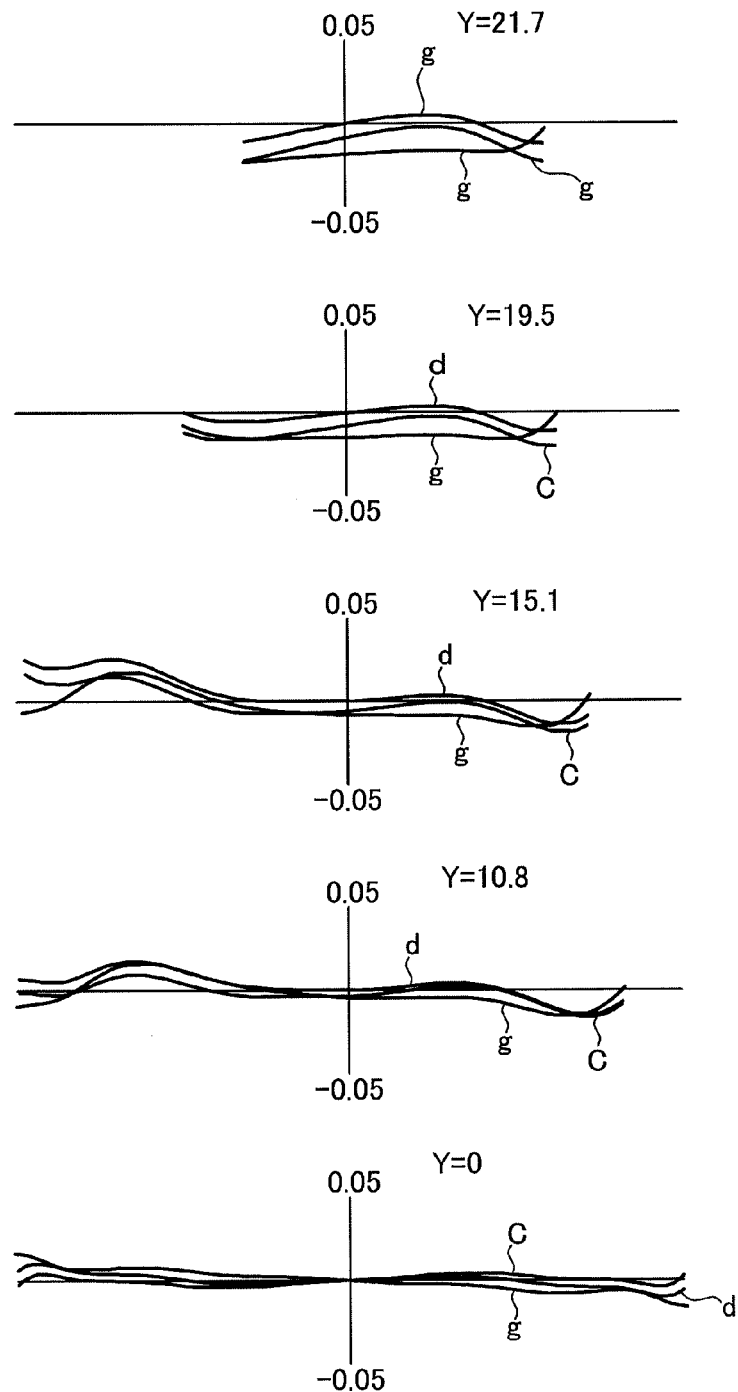
FIG. 20 is graphs illustrating comatic aberration in the third embodiment of the large-aperture zoom lens, taking the zooming posture at the telephoto end and set at infinity focus.
Figure 21:
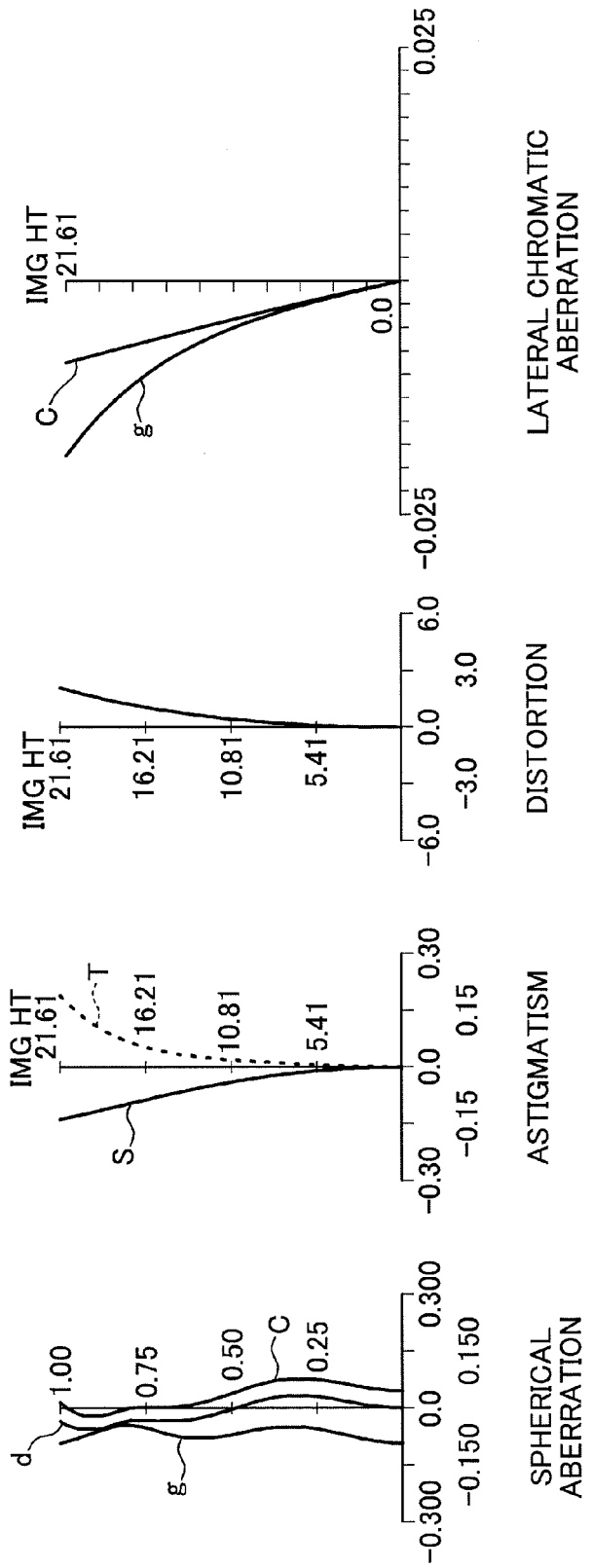
FIG. 21 is graphs illustrating spherical aberration, astigmatism, distortion, and chromatic aberration of magnification in the third embodiment of the large-aperture zoom lens, taking the zooming posture at the telephoto end and set at infinity focus.
Figure 22:
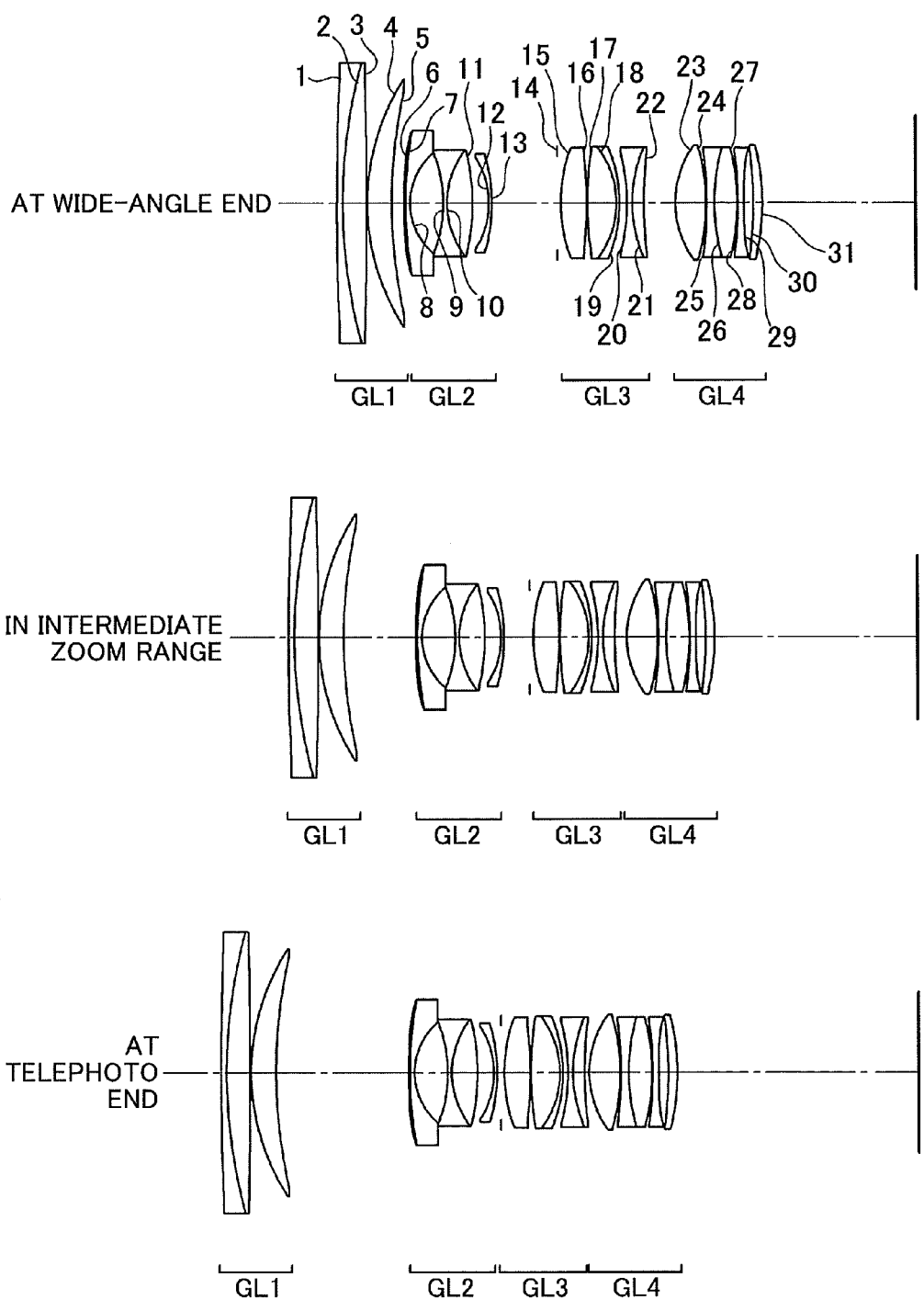
FIG. 22 is a sectional view illustrating a fourth embodiment of the large-aperture zoom lens according to the present invention, taking a varied zooming posture, at the wide-angle end, in the intermediate zone, and the telephoto end, respectively.
Figure 23:
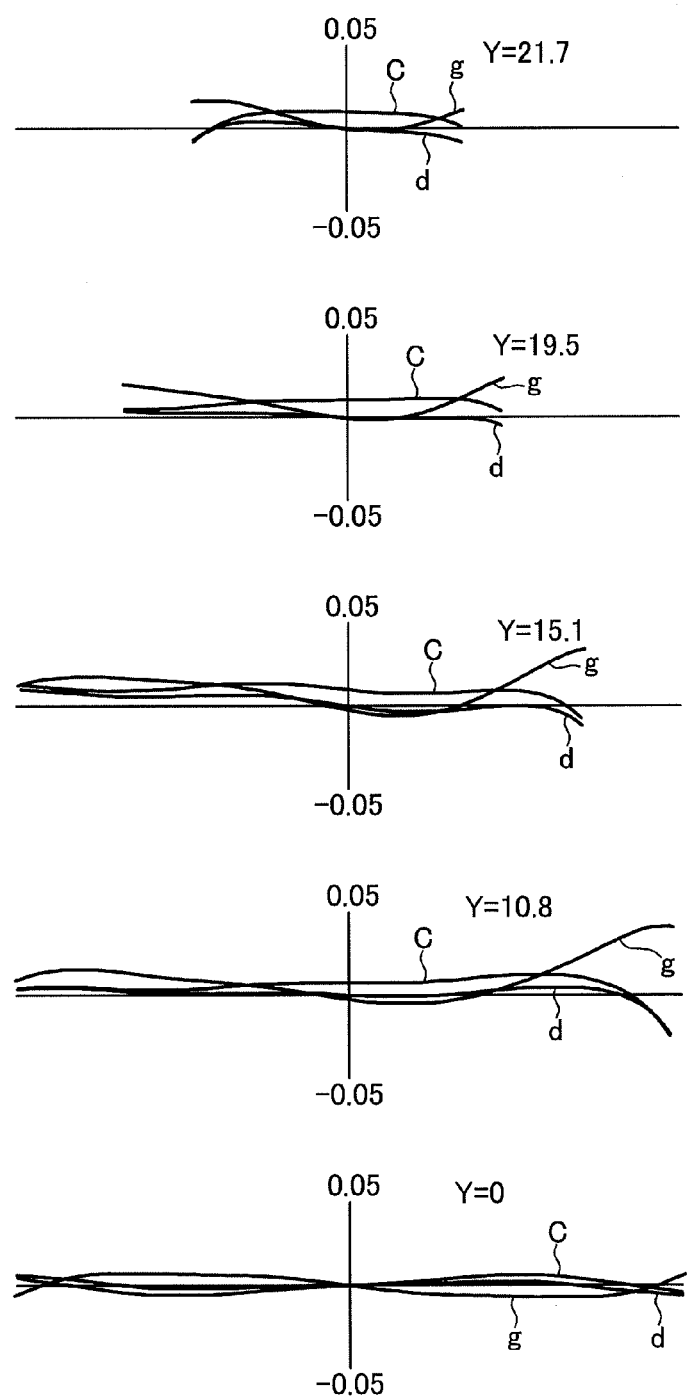
FIG. 23 is graphs illustrating comatic aberration in the fourth embodiment of the large-aperture zoom lens, taking the zooming posture at the wide-angle end and set at infinity focus.
Figure 24:
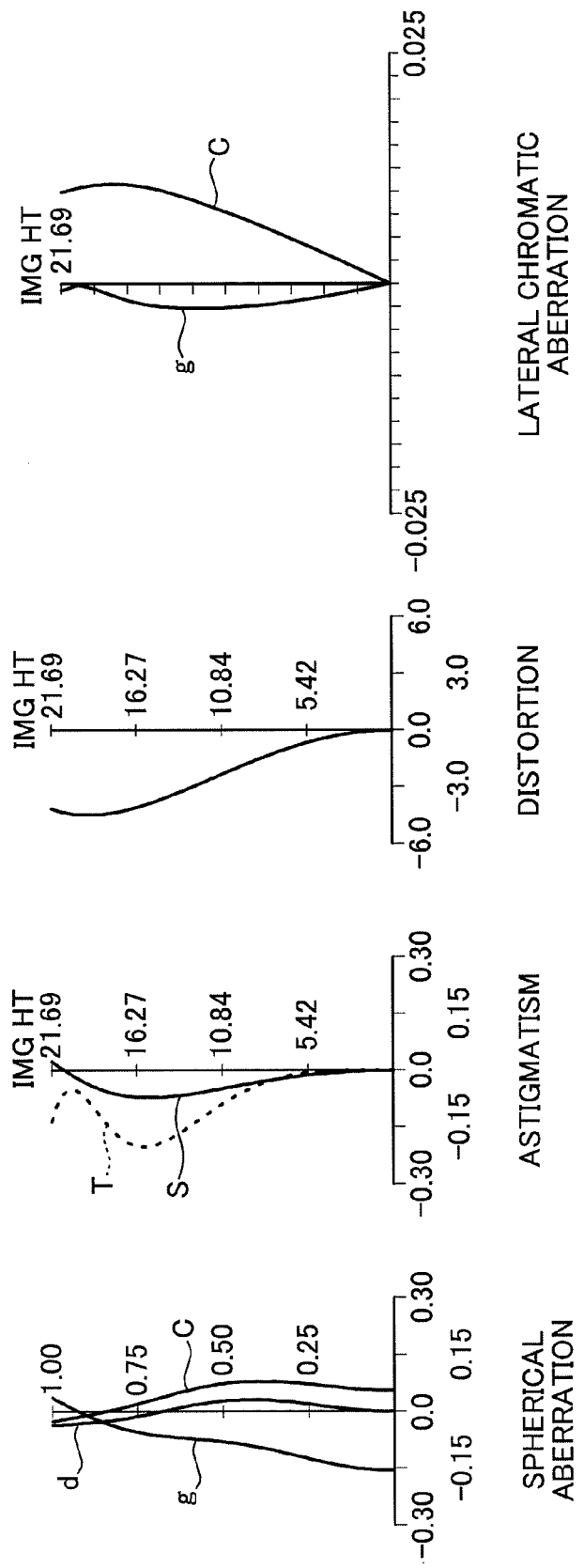
FIG. 24 is graphs illustrating spherical aberration, astigmatism, distortion, and chromatic aberration of magnification in the fourth embodiment of the large-aperture zoom lens, taking the zooming posture at the wide-angle end and set at infinity focus.
Figure 25:
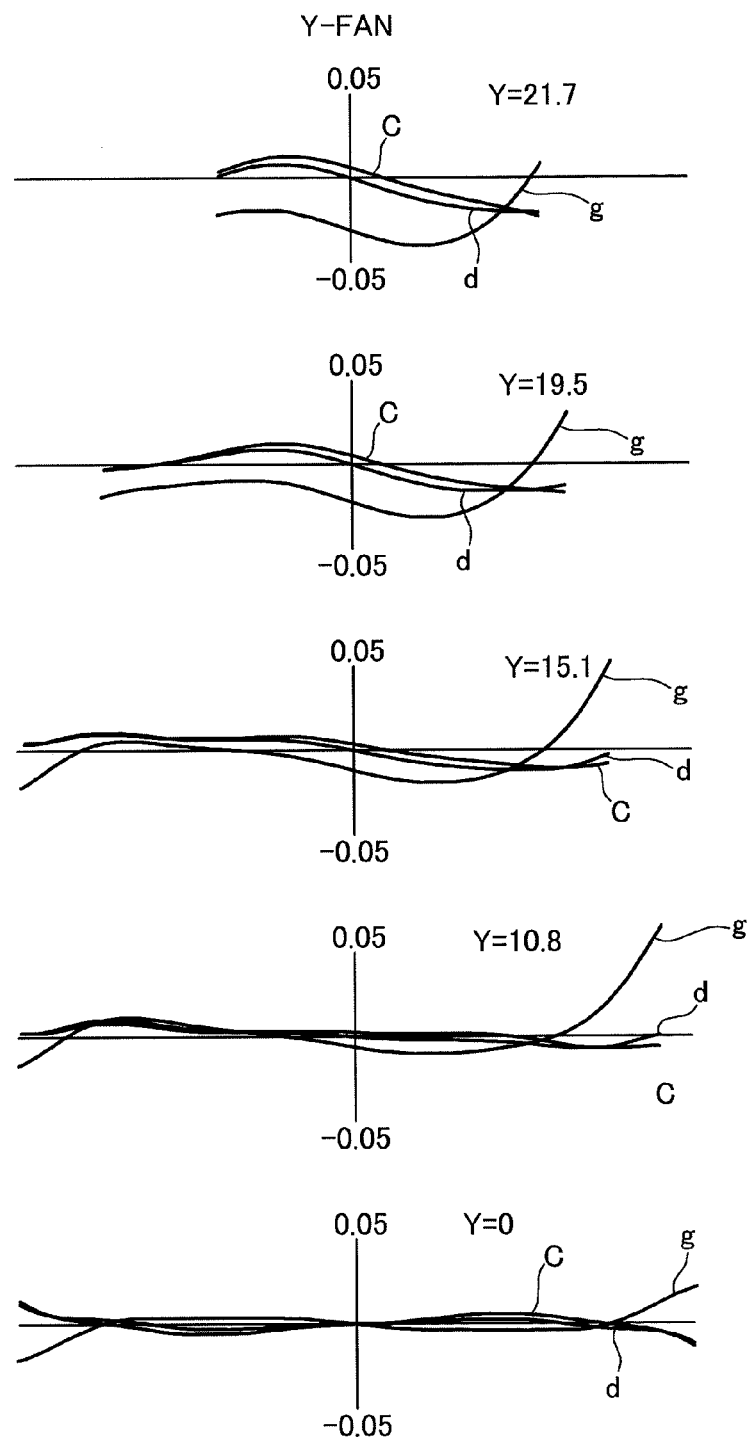
FIG. 25 is graphs illustrating comatic aberration in the fourth embodiment of the large-aperture zoom lens, taking the zooming posture in the intermediate zoom range and set at infinity focus.
Figure 26:
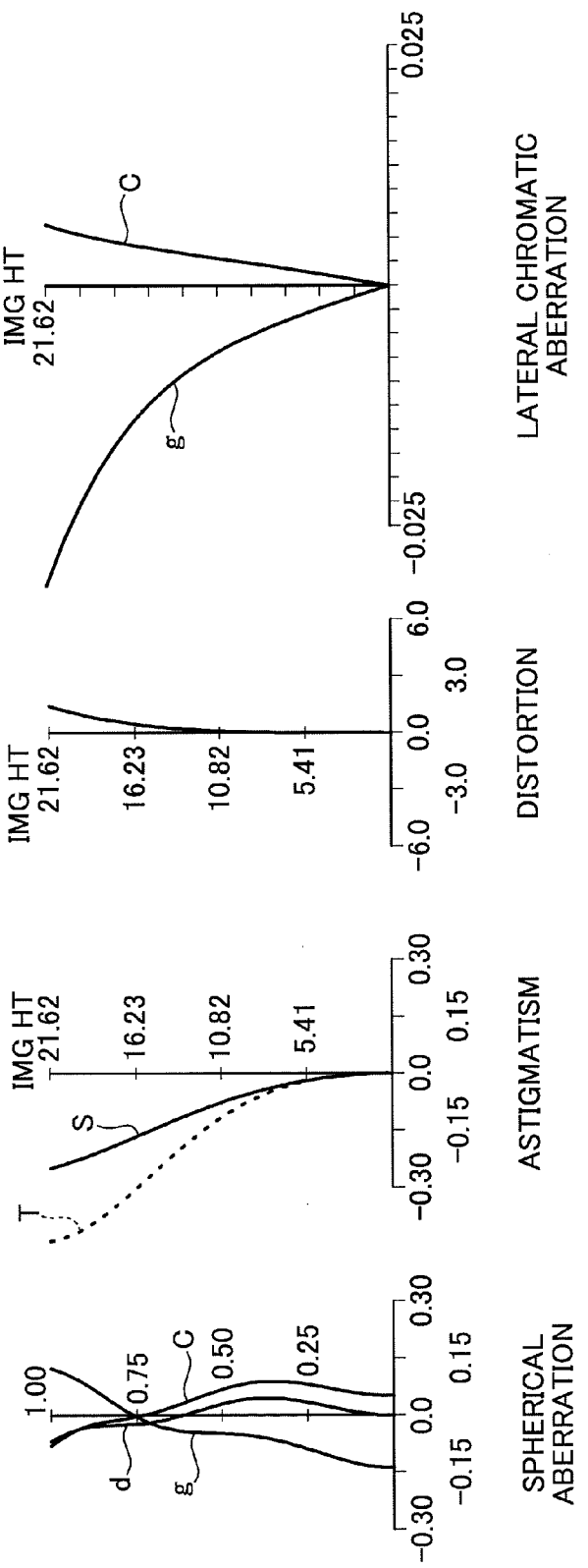
FIG. 26 is graphs illustrating spherical aberration, astigmatism, distortion, and chromatic aberration of magnification in the fourth embodiment of the large-aperture zoom lens, taking the zooming posture in the intermediate zoom zone and set at infinity focus.
Figure 27:
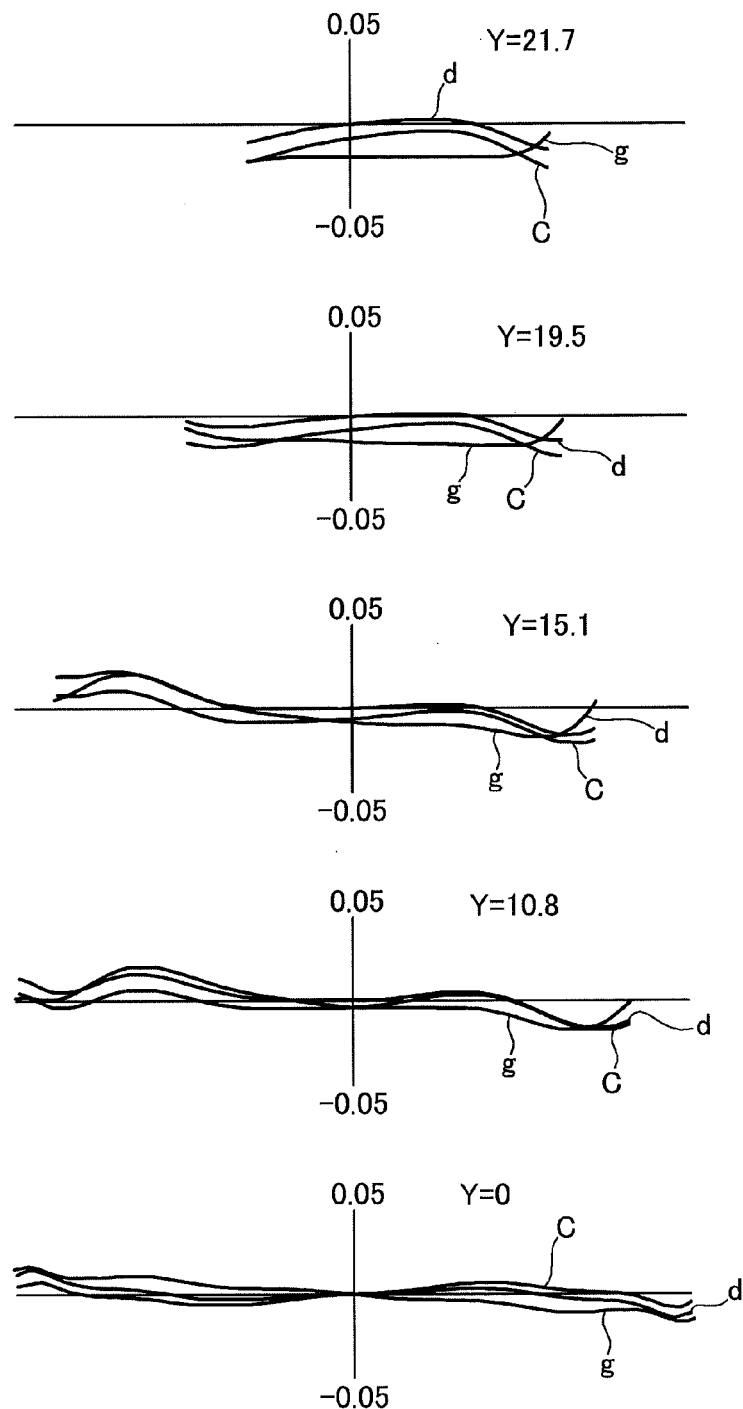
FIG. 27 is graphs illustrating comatic aberration in the fourth embodiment of the large-aperture zoom lens, taking the zooming posture at the telephoto end and set at infinity focus.

A first embodiment of a large-aperture zoom lens according to the present invention is comprised of four groups of lens pieces in a sequence, having positive, negative, positive, and positive refractive attributes, respectively. For surfaces of the lens pieces each denoted by a specific reference numeral (NS), their respective radii of curvature (R in mm), distances to the next, namely, center thicknesses of the lens pieces and clearances from one lens piece to another (D in mm), refractive indices (Nd) with respect to the Fraunhofer d-line, and Abbe constants (ABV) are as listed in a table below.

| (Wide-Angle End~Intermediate Zoom Range~Telephoto End) | | | | |
|---|---|---|---|---|
| Focal Length | 24.7~42.5~73.0 | | | |
| 2ω | 84.77~53.11~32.10 | | | |
| FNo | 2.9~2.9~2.9 | | | |
| NS | R | D | Nd | ABV |
| 1 | 284.1445 | 1.5000 | 1.84666 | 23.78 |
| 2 | 91.1772 | 7.5095 | 1.61800 | 63.39 |
| 3 | 1369.2772 | 0.2000 | | |
| 4 | 64.2551 | 6.3394 | 1.83481 | 42.72 |
| 5 | 171.2861 | D(5) | | |
| 6 ASPH | 438.6450 | 0.3000 | 1.51460 | 49.96 |
| 7 | 120.1355 | 1.0000 | 1.83400 | 37.34 |
| 8 | 18.1801 | 8.4904 | | |
| 9 | −35.1683 | 1.7068 | 1.72916 | 54.67 |
| 10 | 24.1587 | 7.0000 | 1.90366 | 31.31 |
| 11 | −53.3407 | 3.3989 | | |
| 12 | −21.5164 | 0.8000 | 1.49700 | 81.61 |
| 13 | −41.7143 | D(13) | | |
| 14 STOP | INF | 1.0000 | | |
| 15 ASPH | 36.5137 | 5.6750 | 1.61881 | 63.85 |
| 16 ASPH | −62.6467 | 0.1500 | | |
| 17 | 329.4506 | 2.7512 | 1.61800 | 63.39 |
| 18 | −91.4232 | 0.1500 | | |
| 19 | 841.9823 | 4.8114 | 1.49700 | 81.61 |
| 20 | −33.0923 | 0.8000 | 1.90366 | 31.31 |
| 21 | −86.5152 | 2.3149 | | |
| 22 ASPH | −54.5935 | 1.3000 | 1.83441 | 37.28 |
| 23 | 38.5158 | 3.0000 | 1.80809 | 22.76 |
| 24 | 140.9661 | D(24) | | |
| 25 | 28.3190 | 5.0368 | 1.49700 | 81.61 |
| 26 | −446.7281 | 1.5000 | 1.90366 | 31.31 |
| 27 | 61.1653 | 7.3881 | 1.61800 | 63.39 |
| 28 | −36.7275 | 0.1500 | | |
| 29 ASPH | −187.7616 | 1.7000 | 1.80610 | 40.74 |
| 30 ASPH | 500.0000 | D(30) | | |

In the table of the specific values, ASPH designates an aspheric surface represented in the following formula:

Equation of Asphere $$z = \frac{y^2}{R\left(1 + \sqrt{1 - (\varepsilon y/R^2)^2}\right)} + Ay^2 + By^4 + Cy^6 + Dy^8 + Ey^{10} + Fy^{12}$$

where z is a depth of the aspheric surface, y is a height from the optical axis, R is a paraxial radius of curvature, and $\varepsilon$, A, B, C, D, E and F are aspheric coefficients.

Given below are values of the aspheric coefficients.

| ASPH | $\varepsilon$ | 2(A) | 4(B) | 6(C) | 8(D) | 10(E) |
|---|---|---|---|---|---|---|
| 6 | 1.0000 | 0.00000e+000 | 1.45719e−005 | −2.72908e−008 | 1.07450e−010 | −2.85587e−013 |
| 15 | −0.6694 | 0.00000e+000 | −4.64766e−008 | 6.37463e−009 | −3.35425e−011 | −4.67493e−015 |
| 16 | 1.0000 | 0.00000e+000 | 2.04771e−006 | 1.26450e−008 | −7.89752e−011 | 6.36275e−014 |
| 22 | 1.0000 | 0.00000e+000 | 4.90553e−006 | 1.12211e−008 | −9.95818e−011 | 2.11820e−013 |
| 29 | 1.0000 | 0.00000e+000 | 5.24453e−006 | −9.59672e−009 | −6.16871e−011 | −1.13177e−013 |
| 30 | 1.0000 | 0.00000e+000 | 2.25710e−005 | 9.35597e−009 | −9.31938e−012 | −1.20481e−013 |

A varied distance from one lens piece to another with a varied focal length (mm) during the zooming is detailed as follows:

| | F | | |
|---|---|---|---|
| | 24.7000 | 42.5000 | 73.0000 |
| D(5) | 3.3640 | 19.1939 | 38.1742 |
| D(13) | 19.4664 | 8.2810 | 1.5000 |
| D(24) | 7.2251 | 2.9962 | 1.2000 |
| D(30) | 42.0419 | 54.9368 | 66.4861 |

Numerical data as given below may be applied to the aforementioned formulae (5), (6) and (7), respectively:

$(F12W \times F12T)/(F34W \times F34T) = 0.973$  (5-a)

$ST\_W/Fw = 3.522$  (6-a)

$F3/F4 = 1.191$  (7-a)

Embodiment 2

A second embodiment of the large-aperture zoom lens according to the present invention is comprised of four groups of lens pieces in a sequence, having positive, negative, positive, and positive refractive attributes, respectively. For surfaces of the lens pieces each denoted by a specific reference numeral (NS), their respective radii of curvature (R in mm), distances to the next, namely, center thicknesses of the lens pieces and clearances from one lens piece to another (D in mm), refractive indices (Nd) with respect to the Fraunhofer d-line, and Abbe constants (ABV) are as listed in a table below.

| (Wide-Angle End~Intermediate Zoom Range~Telephoto End) | | | | |
|---|---|---|---|---|
| Focal Length | 24.7~42.5~67.8 | | | |
| 2ω | 84.87~53.22~34.53 | | | |
| FNo | 2.9~2.9~2.9 | | | |
| NS | R | D | Nd | ABV |
| 1 | 661.1552 | 1.5000 | 1.92286 | 20.88 |
| 2 | 130.3213 | 6.3139 | 1.80420 | 46.50 |
| 3 | −4565.3056 | 0.2000 | | |
| 4 | 60.6091 | 6.8498 | 1.80420 | 46.50 |
| 5 | 148.7375 | D(5) | | |
| 6 ASPH | 344.1297 | 0.3000 | 1.51460 | 49.96 |
| 7 | 114.8646 | 1.2000 | 1.83400 | 37.34 |
| 8 | 17.3354 | 8.4450 | | |
| 9 | −36.7842 | 1.0000 | 1.71300 | 53.94 |
| 10 | 22.9590 | 6.8000 | 1.90366 | 31.31 |
| 11 | −56.2998 | 4.0777 | | |
| 12 | −22.5064 | 0.8000 | 1.49700 | 81.61 |
| 13 | −51.8673 | D(13) | | |
| 14 STOP | INF | 1.0000 | | |
| 15 ASPH | 45.7224 | 7.6076 | 1.61881 | 63.85 |

-continued

| NS | R | D | Nd | ABV |
|---|---|---|---|---|
| 16 ASPH | −104.4322 | 0.1500 | | |
| 17 | 69.7256 | 7.3476 | 1.49700 | 81.61 |
| 18 | −24.0128 | 0.8000 | 1.90366 | 31.31 |
| 19 | −36.5100 | 1.2947 | | |
| 20 ASPH | −48.9833 | 1.3000 | 1.69350 | 53.20 |
| 21 | 36.0273 | 3.0000 | 1.75520 | 27.53 |
| 22 | 104.9515 | D(22) | | |
| 23 | 25.2714 | 7.2848 | 1.49700 | 81.61 |
| 24 | −64.3808 | 0.2000 | | |
| 25 | −242.5653 | 2.1761 | 1.90366 | 31.31 |
| 26 | 44.4610 | 6.0595 | 1.71300 | 53.94 |
| 27 | −44.4610 | 0.2000 | | |
| 28 ASPH | −52.0680 | 1.5000 | 1.82080 | 42.71 |
| 29 ASPH | 203.3517 | 2.7510 | | |
| 30 | −95.2430 | 3.0000 | 1.74330 | 49.22 |
| 31 | −50.7974 | D(31) | | |

Given below are values of aspheric coefficients:

| ASPH | ε | 2(A) | 4(B) | 6(C) | 8(D) | 10(E) |
|---|---|---|---|---|---|---|
| 6 | 1.0000 | 0.00000e+000 | 1.43935e−005 | −2.45660e−008 | 6.65662e−011 | −1.34219e−013 |
| 15 | 0.4440 | 0.00000e+000 | 2.18447e−006 | 1.98060e−008 | −3.88625e−011 | 3.06529e−013 |
| 16 | 1.0000 | 0.00000e+000 | 6.15022e−006 | 3.73506e−009 | 1.49775e−010 | −6.34135e−013 |
| 20 | 1.0000 | 0.00000e+000 | 4.18498e−006 | −2.60360e−009 | 3.22818e−011 | −1.38649e−013 |
| 28 | 1.0000 | 0.00000e+000 | 4.42927e−006 | −2.07331e−008 | 4.06536e−011 | −1.48664e−013 |
| 29 | 1.0000 | 0.00000e+000 | 2.34708e−005 | −7.77964e−011 | 8.09661e−011 | −8.49344e−014 |

A varied distance from one lens piece to another with a varied focal length (mm) during the zooming is detailed as follows:

| | F | | |
|---|---|---|---|
| | 24.7000 | 42.5000 | 67.8000 |
| D(5) | 3.1863 | 18.8703 | 33.9743 |
| D(13) | 16.7273 | 6.6040 | 1.0000 |
| D(22) | 8.6767 | 3.3424 | 1.2000 |
| D(31) | 39.3869 | 51.9165 | 62.0466 |

Numerical data as given below may be applied to the aforementioned formulae (5), (6) and (7), respectively:

$$(F12W \times F12T)/(F34W \times F34T) = 0.874 \quad (5\text{-}b)$$

$$ST\_W/Fw = 3.795 \quad (6\text{-}b)$$

$$F3/F4 = 1.238 \quad (7\text{-}b)$$

Embodiment 3

A third embodiment of the large-aperture zoom lens according to the present invention is comprised of four groups of lens pieces in a sequence, having positive, negative, positive, and positive refractive attributes, respectively. For surfaces of the lens pieces each denoted by a specific reference number (NS), their respective radii of curvature (R in mm), distances to the next, namely, center thicknesses of the lens pieces and clearances from one lens piece to another (D in mm), refractive indices (Nd) with respect to the Fraunhofer d-line, and Abbe constants (ABV) are as listed in a table below.

| (Wide-Angle End~Intermediate Zoom Range~Telephoto End) | |
|---|---|
| Focal Length | 24.7~42.5~67.8 |
| 2ω | 85.0~53.35~34.23 |
| FNo | 2.9~2.9~2.9 |

| NS | R | D | Nd | ABV |
|---|---|---|---|---|
| 1 | 623.8253 | 1.5000 | 1.92286 | 20.88 |
| 2 | 128.1427 | 6.2544 | 1.80420 | 46.50 |
| 3 | −4080.6871 | 0.2000 | | |
| 4 | 59.2639 | 6.5873 | 1.80420 | 46.50 |
| 5 | 137.7116 | D(5) | | |
| 6 ASPH | 395.2735 | 0.3000 | 1.51460 | 49.96 |
| 7 | 109.7270 | 1.2000 | 1.83400 | 37.34 |
| 8 | 17.3658 | 8.6457 | | |
| 9 | −36.0723 | 1.0000 | 1.71300 | 53.94 |
| 10 | 23.2704 | 6.8000 | 1.90366 | 31.31 |
| 11 | −55.7282 | 4.4523 | | |
| 12 | −22.0649 | 0.8000 | 1.49700 | 81.61 |
| 13 | −48.6467 | D(13) | | |
| 14 STOP | INF | 1.0000 | | |
| 15 ASPH | 41.8693 | 7.5232 | 1.61881 | 63.85 |
| 16 ASPH | −89.4058 | 0.1500 | | |
| 17 | 89.8411 | 7.3848 | 1.49700 | 81.61 |
| 18 | −25.1245 | 0.8000 | 1.90366 | 31.31 |
| 19 | −39.1233 | 1.3419 | | |
| 20 ASPH | −52.2242 | 1.3000 | 1.69350 | 53.20 |
| 21 | 34.6520 | 3.0000 | 1.75520 | 27.53 |
| 22 | 92.7667 | D(22) | | |
| 23 | 25.9719 | 7.3123 | 1.49700 | 81.61 |
| 24 | −50.4719 | 0.2000 | | |
| 25 | −97.3238 | 2.0000 | 1.90366 | 31.31 |
| 26 | 55.0604 | 6.8498 | 1.71300 | 53.94 |
| 27 | −55.0604 | 0.2000 | | |
| 28 ASPH | −86.4357 | 1.5000 | 1.82080 | 42.71 |
| 29 ASPH | 487.5778 | 2.3534 | | |
| 30 | −104.0408 | 2.3584 | 1.69350 | 53.34 |
| 31 | −60.0000 | D(31) | | |

Values of aspheric coefficients are given below:

| ASPH | ε | 2(A) | 4(B) | 6(C) | 8(D) | 10(E) |
|---|---|---|---|---|---|---|
| 6 | 1.0000 | 0.00000e+000 | 1.52161e−005 | −2.64328e−008 | 7.13362e−011 | −1.38028e−013 |
| 15 | 0.0761 | 0.00000e+000 | 1.59895e−006 | 2.70095e−008 | −6.37095e−011 | 4.43442e−013 |
| 16 | 1.0000 | 0.00000e+000 | 5.55796e−006 | 9.34166e−009 | 1.60766e−010 | −7.20357e−013 |
| 20 | 1.0000 | 0.00000e+000 | 3.70571e−006 | 1.35239e−009 | 2.19659e−011 | −1.42422e−013 |

-continued

| ASPH | ε | 2(A) | 4(B) | 6(C) | 8(D) | 10(E) |
|---|---|---|---|---|---|---|
| 28 | 1.0000 | 0.00000e+000 | 2.17520e-007 | 1.04129e-008 | -2.88399e-011 | -1.15861e-013 |
| 29 | 1.0000 | 0.00000e+000 | 1.69936e-005 | 2.96400e-008 | 1.19806e-012 | -3.54092e-014 |

A varied distance from one lens piece to another with a varied focal length (mm) during the zooming is detailed as follows:

| | F | | |
|---|---|---|---|
| | 24.7000 | 42.5000 | 67.8000 |
| D(5) | 3.1759 | 18.9255 | 34.1224 |
| D(13) | 16.6843 | 6.5856 | 1.0000 |
| D(22) | 8.3160 | 3.2312 | 1.2000 |
| D(31) | 40.1396 | 52.8165 | 63.0609 |

Numerical data as given below may be applied to the aforementioned formulae (5), (6) and (7), respectively:

$$(F12W \times F12T)/(F34W \times F34T) = 0.855 \quad (5\text{-c})$$

$$ST\_W/Fw = 3.795 \quad (6\text{-c})$$

$$F3/F4 = 1.24 \quad (7\text{-c})$$

Embodiment 4

A fourth embodiment of the large-aperture zoom lens according to the present invention is comprised of four groups of lens pieces in a sequence, having positive, negative, positive, and positive refractive attributes, respectively. For surfaces of the lens pieces each denoted by a specific reference number (NS), their respective radii of curvature (R in mm), distances to the next, namely, center thicknesses of the lens pieces and clearances from one lens piece to another (D in mm), refractive indices (Nd) with respect to the Fraunhofer d-line, and Abbe constants (ABV) are as listed in a table below. The third group of lens pieces of positive refractive power is comprised of a subgroup G31 of positive refractivity and a subgroup G32 of negative refractivity. The zoom lens varies the magnification power during the zooming by varying a distance from the positive subgroup G21 to the negative subgroup G32 while it compensates for image blur due to hands' tremor by moving the negative subgroup G32 of the third group G31 of lens pieces in directions orthogonal to the optical axis.

| | (Wide-Angle End~Intermediate Zoom Range~Telephoto End) |
|---|---|
| Focal Length | 24.7~42.5~67.8 |
| 2ω | 85.0~53.35~34.23 |
| FNo | 2.9~2.9~2.9 |

-continued

| NS | R | D | Nd | ABV |
|---|---|---|---|---|
| 1 | 935.8082 | 1.5000 | 1.92286 | 20.88 |
| 2 | 141.0527 | 6.1958 | 1.80420 | 46.50 |
| 3 | -1146.6586 | 0.2000 | | |
| 4 | 59.8022 | 6.4783 | 1.80420 | 46.50 |
| 5 | 138.1563 | D(5) | | |
| 6 ASPH | 314.9264 | 0.3000 | 1.51460 | 49.96 |
| 7 | 105.8749 | 1.2000 | 1.83400 | 37.34 |
| 8 | 17.3128 | 8.6870 | | |
| 9 | -34.9525 | 1.0000 | 1.71300 | 53.94 |
| 10 | 23.1270 | 6.6500 | 1.90366 | 31.31 |
| 11 | -55.8238 | 4.2654 | | |
| 12 | -21.9452 | 0.8000 | 1.49700 | 81.61 |
| 13 | -44.4267 | D(13) | | |
| 14 STOP | INF | 1.0000 | | |
| 15 ASPH | 45.6293 | 6.7500 | 1.61881 | 63.85 |
| 16 ASPH | -83.5479 | 0.1500 | | |
| 17 | 95.4151 | 7.5000 | 1.49700 | 81.61 |
| 18 | -23.9796 | 0.8000 | 1.90366 | 31.31 |
| 19 | -37.4030 | D(19) | | |
| 20 ASPH | -47.5340 | 1.3000 | 1.69350 | 53.20 |
| 21 | 36.6179 | 3.0000 | 1.75520 | 27.53 |
| 22 | 111.2047 | D(22) | | |
| 23 | 25.8440 | 8.0000 | 1.49700 | 81.61 |
| 24 | -52.5335 | 0.2000 | | |
| 25 | -103.1176 | 2.0000 | 1.90366 | 31.31 |
| 26 | 54.7004 | 6.0104 | 1.71300 | 53.94 |
| 27 | -54.7004 | 0.2000 | | |
| 28 ASPH | -84.7582 | 1.5000 | 1.82080 | 42.71 |
| 29 ASPH | 487.5778 | 2.4845 | | |
| 30 | -102.2081 | 2.3423 | 1.74330 | 49.22 |
| 31 | -60.0000 | D(31) | | |

Given below are values of aspheric coefficients:

| ASPH | ε | 2(A) | 4(B) | 6(C) | 8(D) | 10(E) |
|---|---|---|---|---|---|---|
| 6 | 1.0000 | 0.00000e+000 | 1.43821e-005 | -2.52546e-008 | 7.46124e-011 | -1.61976e-013 |
| 15 | 0.0883 | 0.00000e+000 | 1.63947e-006 | 2.74286e-008 | -1.09388e-010 | 6.10564e-013 |
| 16 | 1.0000 | 0.00000e+000 | 5.27374e-006 | 4.71512e-009 | 1.56698e-010 | -8.27035e-013 |
| 20 | 1.0000 | 0.00000e+000 | 4.43544e-006 | -5.49207e-010 | 1.55881e-011 | -1.14261e-013 |
| 28 | 1.0000 | 0.00000e+000 | 5.26332e-006 | -5.66812e-009 | -6.55846e-012 | -1.35552e-013 |
| 29 | 1.0000 | 0.00000e+000 | 2.25411e-005 | 1.29573e-008 | 3.31551e-011 | -6.66568e-014 |

A varied distance from one lens piece to another with a varied focal length (mm) during the zooming is detailed as follows:

| | F | | |
|---|---|---|---|
| | 24.7000 | 42.5000 | 67.7990 |
| D(5) | 3.2354 | 18.8990 | 34.5562 |
| D(13) | 17.0881 | 6.6767 | 1.0000 |
| D(19) | 2.0000 | 1.6500 | 1.3596 |
| D(22) | 8.1524 | 3.0901 | 1.2000 |
| D(31) | 40.3258 | 53.2243 | 63.2093 |

Numerical data as given below may be applied to the aforementioned formulae (5), (6) and (7), respectively:

$$(F12W \times F12T)/(F34W \times F34T) = 0.876 \quad (5\text{-d})$$

$$ST\_W/Fw = 3.794 \quad (6\text{-d})$$

$$F3/F4 = 1.302 \quad (7\text{-d})$$

What is claimed is:

1. In a large-aperture zoom lens that comprises the foremost or first lens group of positive refractive power, the second or second foremost lens group of negative refractive power, the third lens group of positive refractive power, and the rearmost or fourth lens group of positive refractive power, all arranged in this sequence from the closest to an object to the closest to an imaging plane, and that permits the magnification power to vary by varying clearances between adjacent ones of the first lens group to the fourth lens group, part of lens pieces in the third lens group is moved in directions orthogonal to the optical axis to compensate for image blur due to hands' tremor, the zoom lens meeting the requirements as defined in the following formula:

$$0.7 < (F12W \times F12T)/(F34W \times F34T) < 1.1$$

where F12W is a composite focal length of the first and second lens groups at the wide-angle end, F34W is the composite focal length of the third and fourth lens groups at the wide-angle end, F12T is the composite focal length of the first and second lens groups at the telephoto end, and F34T is the composite focal length of the third and fourth lens groups at the telephoto end.

2. The large-aperture zoom lens according to claim 1, further comprising an aperture-stop at the wide-angle end, wherein the zoom lens meets the requirements regarding its aperture-stop position at the wide-angle end and its focal length Fw at the wide-angle end, as defined in the following formula:

$$3.2 < ST\_W/Fw < 4$$

where ST_W is a distance from the aperture stop to the imaging plane at the wide-angle end, and Fw is a focal length of the entire optics at the wide-angle end.

3. The large-aperture zoom lens according to claim 1, wherein the zoom lens meets the requirements regarding focal lengths of the third lens group and the fourth lens group, as defined in the following formula:

$$1.0 < F3/F4 < 1.5$$

where F3 is the focal length of the third lens group, and F4 is the focal length of the fourth lens group.

* * * * *